United States Patent [19]
Nakamura et al.

[11] Patent Number: 5,752,036
[45] Date of Patent: May 12, 1998

[54] APPARATUS FOR GENERATING A PROGRAM FOR PARALLEL PROCESSING

[75] Inventors: Eri Nakamura; Fumio Nagasaka, both of Nagano, Japan

[73] Assignee: Seiko Epson Corporation, Tokyo, Japan

[21] Appl. No.: 318,448

[22] Filed: Oct. 5, 1994

[30] Foreign Application Priority Data

Oct. 5, 1993 [JP] Japan .................................. 5-249575
Oct. 5, 1993 [JP] Japan .................................. 5-249577

[51] Int. Cl.$^6$ .......................................................... G06F 9/44
[52] U.S. Cl. .......................... 395/706; 395/703; 382/303; 382/304; 358/448
[58] Field of Search ............................... 395/650, 700, 395/706, 703, 163; 364/920.7, 235, 235.5, 235.7, 930, 930.7; D18/50, 54; 382/303, 304; 358/448

[56] References Cited

U.S. PATENT DOCUMENTS

| 5,136,717 | 8/1992 | Morley et al. ........................ 395/800 |
| 5,274,818 | 12/1993 | Vasilevsky et al. ................... 395/700 |
| 5,333,246 | 7/1994 | Nagasaka ............................... 395/133 |
| 5,345,588 | 9/1994 | Greenwood et al. ................ 395/650 |
| 5,481,656 | 1/1996 | Wakabayashi et al. .............. 395/115 |

FOREIGN PATENT DOCUMENTS

| 0400328 | 12/1990 | European Pat. Off. . |
| A-2132525 | 5/1990 | Japan . |

OTHER PUBLICATIONS

Grimshaw et al, "Dynamic Object—Oriented Parallel Processing", IEEE Parallel and Distributed Technology, May 1993, pp. 33–45.

Kritskli et al. Abstract of Programmiroovanie vol. 20 No. 4: Institute of Electrical Engineers. Jul. 1994, "Parallel text rendering by a Postscript interpreter".

G. Lee et al: "An Empirical Study of Automatic Restructuring of Nonnumerical Programs for Parallel Processors" Oct. 1985.

A. Goddard et al.: "Mapping Signal Processing Algorithms onto a Multiprocessor Network" Sep. 1988.

Primary Examiner—Alvin L. Oberley
Assistant Examiner—Michael T. Richey
Attorney, Agent, or Firm—Sughrue, Mion, Zinn, Macpeak & Seas, PLLC

[57] ABSTRACT

In a printer driver 11, a source code for an image processing procedure called out by an application program 12 is generated. A grain size detection process 48 counts the number of procedures which have been called out and a parallelization position detection process 49 checks whether each procedure called out is attended with pixel generation or not and whether the procedure depends on the preceding procedure or not. While calling-out of procedures not dependent on the preceding procedure is continued, source codes for those procedures are accumulated in a buffer 60. Whenever a procedure attended with pixel generation is called out, the printer driver 11 outputs a set of source codes accumulated in the buffer 60 in a description of a complex sentence indicating a parallel processing unit in accordance with the grammar of a parallel sentence structure as long as the aforementioned count value reaches the grain size of a preliminarily set unit of parallel processing. Accordingly, a source code containing parallel executable portions is outputted in accordance with the grammar of page description language.

12 Claims, 22 Drawing Sheets

FIG. 2

```
proceed ---------------------------------------------- 21
  // ---------------------------------------- 23
    begin
      ┌──────────────────────────────────┐
      │ SINGLE SENTENCE OR COMPLEX SENTENCE │ ----- 24
      └──────────────────────────────────┘
    end;
  // ---------------------------------------- 23
      ┌──────────────────┐
      │ SINGLE SENTENCE  │
      └──────────────────┘
  otherwise ------------------------------------- 25
      ┌──────────────────────────────────┐
      │ SINGLE SENTENCE OR COMPLEX SENTENCE │
      └──────────────────────────────────┘
end; ------------------------------------------- 22
```

FIG. 3

```
program
        : PROGRAM IDENT  ';' block '.'
        ;
block
        : declarations compound_stm semicolon
        ;
declarations
        : declarations CONST cnst_dcls
        : OMITTED
        ;
compound_stm
        : BEGIN statements END
        ;
statements
        : statement
        | statements ';'
        | statements ';' statement
        |
        ;
statement
        : p_f_call
        | foo_name
        | foo_name ASSIGN expression
        | arrayname ASSIGN expression
        | compound_stm
        | IF expression THEN statement opt_else
        | WHILE expression DO statement
        | REPEAT statements UNTIL expression
        | FOR IDENT ASSIGN expression direction expression
          DO statement
        | PROCEED when_body opt_other END ⌇⌇⌇ 30
        ;
opt_else
        : ELSE statement
        |
        ;
when_body
        : when_stm
        | when_stm ';'
        | when_stm ';' when_body
        ;
when_stm
        : WHEN
          statement
        ;
opt_other
        : OTHERWISE statements
        |
        ;
```

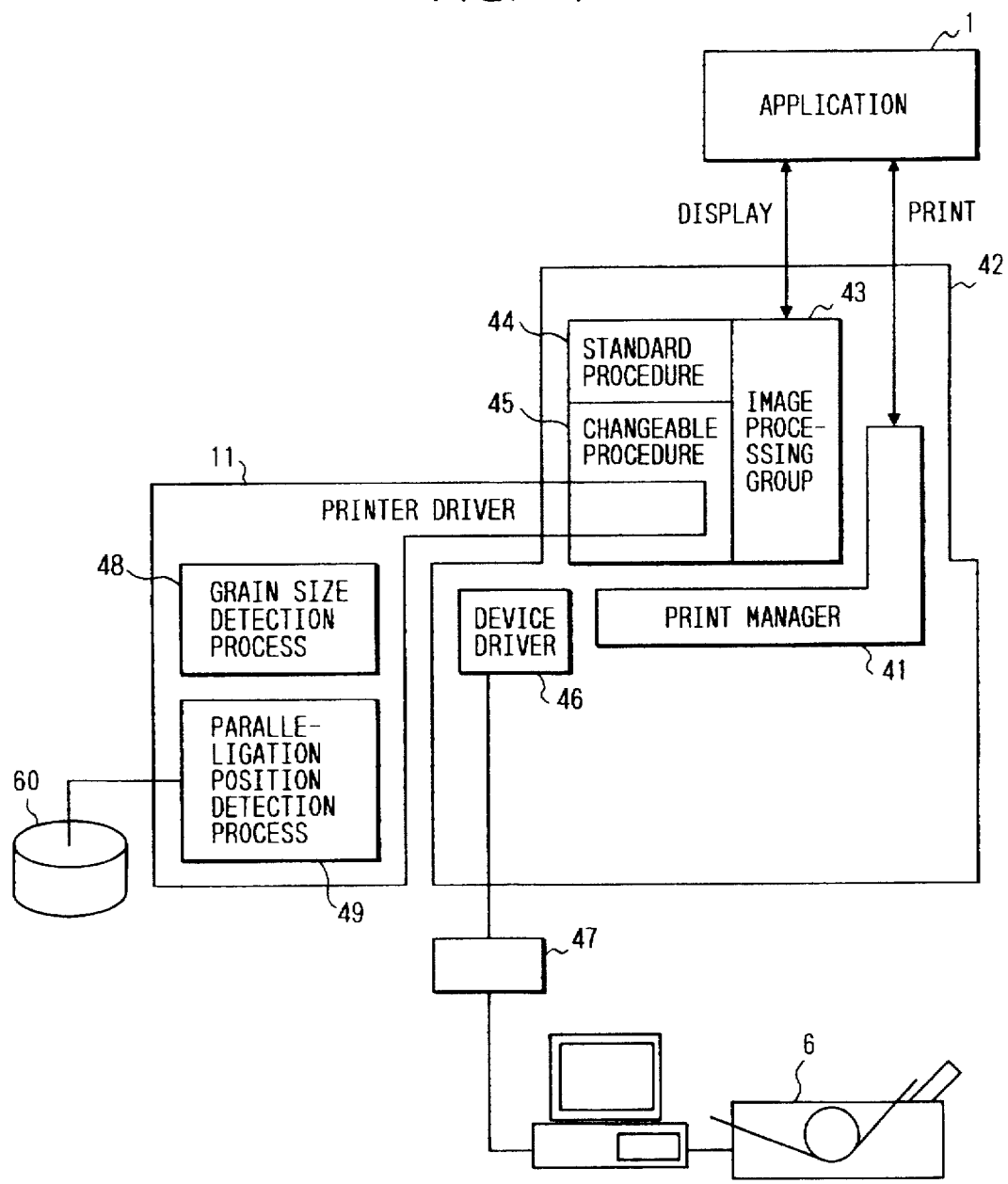

FIG. 7

```
program fool;                    ~71
    begin
        proceed
            // begin
                ┌─────────────┐
                │ CONTENTS OF │  ~72
                │ BUFFER 60   │
                └─────────────┘         ~74
            end;
            // begin
                ┌─────────────┐
                │             │  ~73
                └─────────────┘
            end;
        otherwise
            ;
    end;
        ┌─────────────┐
        │             │ ~77
        └─────────────┘
    proceed  ~75
        ┌─────────────┐           ~74
        │             │
        └─────────────┘
    end;
        showpage;   ~76
end.
```

```
program sample;

begin
  proceed
    //begin
        newpath();
        penPal(258, 1032, 4128, 16512);       ~ 81        ~ 82
        penMode(8);
        rrectangle(149, 149, 250, 220, 28, 28);
        fillpath();
    end;
    //begin
        newpath();
        penPal(-1, -1, -1, -1);
        penMode(8);
        penSize(1, 1);
        polygon(199, 269, 249, 120, 349, 299, 448, 169);
        polysmooth();
        strokepath();
    end;
    otherwise
        begin
            newpath();
            penPal(-1, -1, -1, -1);
            penMode(8);
            oval(353, 164, 35, 128, 71);
            fillpath();
        end;
  end;
  showpage;   ~ 83
end.
```

FIG. 9

```
0000      BRA  (0b)    0002
0003      LEVEL(11)    0001         ─── 92
0006      FORK (2c)
0007      EVAL (2f)
0008      BEQ  (0c)    002a         ─── 93
000a      PUSHC(00)    0015 ──┐
000d      TRAP (2a)           │
000d      PUSHC(00)    0102 ─┐│
000f      PUSHC(00)    0408  ││
0012      PUSHC(00)    1020  ├─ 91
0015      PUSHC(00)    4080  ││
0017      PUSHC(00)    0021  ││
001a      TRAP (2a)          ││
0018      ADDSP(30)    0004 ─┘│  ~94
001a      PUSHC(00)    0008   │
001c      PUSHC(00)    0020   │
001f      TRAP (2a)            │
001d      ADDSP(30)    0001    │
001f      PUSHC(00)    0095    │
0021      PUSHC(00)    0095    │
0023      PUSHC(00)    00fa    │
0025      PUSHC(00)    00dc    │
0027      PUSHC(00)    001c    │
0029      PUSHC(00)    001c    │
002b      PUSHC(00)    001d    │
002e      TRAP (2a)            │
002c      ADDSP(30)    0006    │
002e      PUSHC(00)    0016    │
0031      TRAP (2a)            │
0032      EXIT (2d) ───────────┘
0033      FORK (2c)
0034      EVAL (2f)
0035      BEQ  (0c)    003c
0037      PUSHC(00)    0015
003a      TRAP (2a)

OMITTED

0088      PUSHC(00)    0161
008a      PUSHC(00)    00a4
008c      PUSHC(00)    0023
008e      PUSHC(00)    0080
0090      PUSHC(00)    0047
0092      PUSHC(00)    001b
0095      TRAP (2a)
0093      ADDSP(30)    0005
0095      PUSHC(00)    0016
0098      TRAP (2a)
0099      WAIT (2e)         ─── 95
0099      PUSHC(00)    0014 ─── 96
009c      TRAP (2a)
009d      HLT  (10)
```

APPARATUS FOR GENERATING A PROGRAM FOR PARALLEL PROCESSING

BACKGROUND OF THE INVENTION

The present invention relates to a technique for automatically generating a source code of an intended process in accordance with the grammar of a programming language. Particularly, it relates to an apparatus for writing procedures for processing images such as character patterns, graphic patterns, and so on, by the page, in a printing process of a personal computer.

DESCRIPTION OF THE RELATED ART

1. Parallel Processing

Parallel processing is a technique for improving processing speed. The following two steps are necessary for carrying out parallel processing.

(1) A step of extracting parallel executable portions and parallel inexecutable portions from the contents of an intended process and transmitting the portions to a processing system using expressions identifiable to the processing system.

(2) A step of performing parallel execution by using a plurality of processor resources or the like.

Automatic generation of programming language source code, which is carried out in the present invention, is a technique used in step (1).

2. Automatic Generation of Source Code

Techniques for automatic mechanical generation of a source code have been heretofore widely applied to the field of scientific and technical calculation. For example, there is a technique of "decomposing multiplexed DO loops to generate parallel executable source codes" which has been mainly used for matrix calculation or the like with a parallel FORTRAN compiler or the like as a processing system. Japanese Patent Unexamined Publication Nos. Hei-3-188529 and Hei-2-132525 disclose inventions relating to generation of an efficient parallelization source code in accordance with the characteristic of programming language, as for example, the handling of common variables.

In automatic generation of a source code for a parallel processing program, it is necessary to ensure that there is no difference between a result of parallel execution and a result of sequential execution.

3. Page Description Language

There is a programming language called page description language. This programming language receives as an input a source code of a program expressing a description procedure with respect to graphics or characters and outputs pixel data. A device as a destination of the output may be a printer, CRT, or facsimile equipment. For example, page description language has command words for generating linear pixels, so that a translation execution program of page description language carries out an operation of forming pixels if a user gives information such as a command word for line command, coordinate data of a start portion, coordinate data of an end position, etc. Accordingly, in a displaying or printing process, the operation of outputting a source code of page description language to an application program is easier than the operation of generating pixel data each time.

In command words of page description language, each operation usually entails pixel generation. This means that the average completion time required for processing command words is long. The contents of such processing are adapted also to rough-binding parallel processing in which there is a tendency for parallelization to cause overhead.

Rough-binding type parallel processing can be formed by connecting general-use work stations and the like by a communication means without use of any exclusive hardware and is low in cost and excellent in maintenance, portability and implantation. The development of a system which is fit for use in rough-binding parallel processing contributes greatly to the improvement in processing efficiency.

4. Generation of Source Code in Accordance with the Grammar of Page Description Language A technique in which an application program generates a source code in accordance with the grammar of page description language is similar to a technique in which source code is mechanically generated and which is used in the field of scientific and technical calculation. Page description language however has the following features.

(A) The probability that a regular graphic formed by repeating an operation which appears in a document generated by a human being is low. Accordingly, in most cases, there is no repeat control loop appearing in a generated source code.

(B) Among image generating operations, some operations depend on a preceding processing result and some operations do not. For example, in an operation of superimposing pixels on one another or inverting the luminance in a set region, a processing result varies in accordance with pixel data placed as a background. In this type operation, a sequential operation is required at least in a region where an image overlaps the precedingly arranged image.

Generation of a source code using page description language must be performed while considering the aforementioned features. Japanese Patent Unexamined Publication No. Hei-3-815831 of the present inventor is based on an idea that pixel generation processes for graphics/characters not overlapping each other spatially can be carried out parallelly. In that invention, means for detecting the overlapping of graphics called graphic group detection is used to extract portions which do not overlap one another so as to be capable of being processed independently to thereby extract a source code describing parallel execution. Further, in Japanese Patent Unexamined Publication No. Hei-3815831, the grammar of page description language is not premised on description of parallel sentence structure, so that after source codes are generated once, source codes are read out and analyzed to thereby output independent source codes or intermediate code files for parallel- executable portions.

5. Uniformization of Load

In parallel processing, the point of time when all processors having charge of individual processing portions completed processing was the point of time when a target process was terminated. In other words, if delay of processing occurs in one of the processors, the processing time as a whole is delayed. Therefore, it can be said that processing efficiency is highest when the contents of processing are allocated so that the respective processors will complete processing substantially at the same time.

When parallel processing is performed by using processors nearly equal in processing speed and having known characteristics, efficient parallel processing can be performed if the contents of processing are given to the processors substantially equally. In the case where rough-binding parallel processing is constructed by using general-use work stations or the like, the performance, processing characteristics and so on, of each processor can be known beforehand. Japanese Patent Unexamined Publication No. Hei-3-815831 of the present inventor discloses a rough-binding parallel processing system.

On the other hand, Japanese Patent Unexamined Publication No. Hei-04-127284 is a prior art reference adapted to the case where image operations are carried out by dense-binding parallel processing. Division of a process for parallelization is performed whenever a procedure involving pixel generation is called.

In the graphic group detection process in Japanese Patent Unexamined Publication No. Hei-3-815831, descriptions of operations are read one by one with respect to the whole of generated source codes to thereby calculate regions to be operated. A great deal of processing time is required for this. A long time is required for what is essentially a preprocessing stage before parallel processing. There arises a problem that the processing time is not shortened as expected even though parallel processing is executed if the scale of the subject of processing is unsuitable.

(2) In a source code containing no command dependent on the preceding operation, parallel execution can be performed by operation without any problem even in the case of an image having regions overlapping one another. In this case, the processing time required for detecting graphic groups does not matter.

(3) Graphic groups, each of which forms a unit of parallel processing, vary in size and the number of processing steps, so that uniform load distribution is not obtained at the time of parallel execution. There is yet room for improvement in execution efficiency.

(4) In the technique of Japanese Patent Unexamined Publication No. Hei-04-127284, a process is allocated to processors for parallelization whenever a procedure attended with pixel generation is called. In the case where this method is used in a roughbinding processing system, the overhead caused by the parallelizing process and by communication between processors is large so that efficient parallelization cannot be made.

SUMMARY OF THE INVENTION

The present invention is provided in consideration of the aforementioned problems in the prior art and the objects thereof are as follows.

(1) To prevent wasteful generation of processing procedures in parallelization of processing to thereby draw out the effect of parallel processing more efficiently.

(2) To give loads to a plurality of processors uniformly in parallelization of processing to thereby draw out the effect of parallel processing more efficiently.

According to a first aspect of the present invention, in an apparatus for generating a source code expressing a series of image processing procedures for image formation, a program generating apparatus is characterized by comprising:

an independent procedure detection means for detecting independently executable image processing procedures from the series of image processing procedures;

a procedure counting means for counting the number of the independently executable image processing procedures detected;

a procedure set extraction means for extracting a set of procedures constituted by a suitable number of the independently executable image processing procedures as the grain size of a parallel processing unit from the series of image processing procedures on the basis of an output of the counting means; and a parallel sentence structure generation means for generating a sentence structure of a source code expressing the fact that the extracted set of procedures forms one parallel processing unit.

According to a second aspect of the present invention, in an apparatus for generating a source code expressing a series of image processing procedures for image formation, a program generating apparatus is characterized by comprising:

a procedure number acquiring means for acquiring the number of image processing procedures contained in the whole of the series of image processing procedures;

a processor number acquiring means for acquiring the number of processors enabled to be used in parallel processing;

a grain size determination means for determining the number of procedures as a reference for the grain size of a parallel processing unit on the basis of the number of procedures and the number of processors acquired above;

a procedure set extraction means for extracting a set of procedures constituted by a suitable number of image processing procedures as the grain size from the series of image processing procedures on the basis of an output of the grain size determination means; and a parallel sentence structure generation means for generating a sentence structure of a source code expressing the fact that the extracted set of procedures forms one parallel processing unit.

The program generating apparatus according to the first aspect of the present invention operates as follows.

(1) Independently executable image processing procedures are detected from a series of image processing procedures for image formation. In a preferred embodiment, independently executable image processing procedures are image processing procedures not dependent on preceding image processing procedures.

(2) Then, the number of independently executable image processing procedures detected is counted.

(3) Then, a set of procedures constituted by a suitable number of the independently executable image processing procedures as the grain size of a parallel processing unit is extracted from the series of image processing procedures on the basis of the counted value.

(4) Then, a predetermined sentence structure of a source code expressing the fact that the extracted set of procedures forms one parallel processing unit is generated. Accordingly, a source code containing a description which expresses a parallel processing unit is obtained.

The program generating apparatus according to the second aspect of the present invention operates as follows.

(1) First, the number of image processing procedures contained in the whole of a series of image processing procedures and the number of processors enabled to be used in parallel execution of the series of image processing procedures are acquired. Further, in a preferred embodiment, the number of image processing procedures attended with pixel generation, contained in the whole of the series of image processing procedures is acquired selectively.

(2) Then, the number of procedures as a reference for the grain size of a parallel processing unit is determined on the basis of the thus acquired total number of procedures and the number of processors. Further, in a preferred embodiment, the quotient obtained by dividing the number of image processing procedures attended with image generation by the number of processors is made to be the number of procedures as a reference for the grain size.

(3) Then, a set of image procedures is extracted from the series of image processing procedures on the basis of the determined number of procedures.

(4) Then, a predetermined sentence structure of a source code expressing the fact that the extracted set of procedures forms one parallel processing unit is generated. Accordingly, a source code containing description expressing the parallel processing unit is obtained. so that each parallel processing unit contains a uniform number of image processing procedures.

BRIEF DESCRIPTION OF THE DRAWINGS

FIG. 2 depicts parallel sentences used in the first embodiment.

FIG. 3 is an explanatory view of definition of a sentence structure used in the first embodiment.

FIG. 4 is a diagram of the overall structure of a printer according to the first embodiment.

FIG. 7 is a depiction of a result of program generation in the first embodiment.

FIG. 9 is a view for explaining an example of the operation of the compiler in the first embodiment.

DETAILED DESCRIPTION OF THE PREFERRED EMBODIMENTS

Some preferred embodiments of the present invention will be described and explained below.

1. Operating Environment

The operating environment of the embodiments is an environment satisfying the following conditions.

(1) A plurality of personal computers (hereinafter abbreviated to PCs) or work stations (hereinafter abbreviated to WSs) are connected by a local area network (hereinafter abbreviated to network). For example. specifications defined in accordance with IEEE-802.x are currently widely popularized as the network. Besides the mechanical and electrical connection of the network. there are rules respecting transmission procedure called protocol. In this embodiment. TCP/IP is used as the transmission protocol. TCP/IP. which is a general term for a plurality of protocols. is currently very popular and has been explained in many publications. One such publication is Douglas Comer "INTERNETWORKING WITH TCP/IP: PRINCIPLES. PROTOCOLS. AND ARCHITECTURE". Prentice-Hall. Inc. 1988.

(2) A person using at least one apparatus of the PCs or WSs contained in the aforementioned condition utilizes an application program. Further. the user carries out a printing process in accordance with this application program.

(3) In the PCs or WSs contained in the aforementioned condition. an operating system (hereinafter abbreviated to OS) manages execution and suspension of the application program. OS may have individual specifications for each PC or each WS. Each OS is. however. premised on the assumption that TCP/IP protocols are used on the network. Each OS is further premised on the assumption that so-called multitask processing permits a plurality of processing programs to use CPU resources by means of time division.

2. Outline of Structure and Procedure of the First Embodiment

Figure 1:
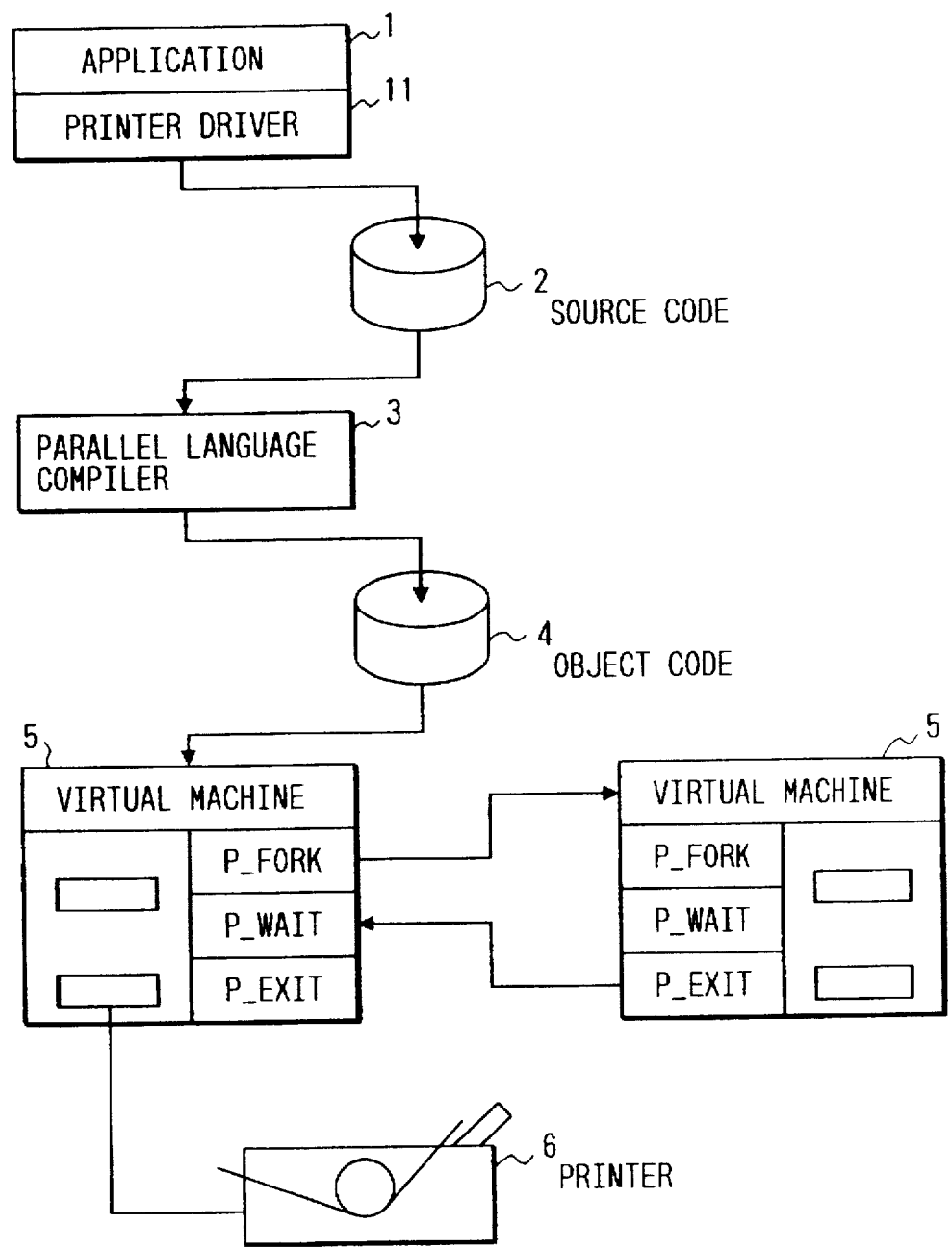
FIG. 1 depicts processing in an application and a printer driver in first embodiment of the present invention.

FIG. 1 is a view showing the outline of the overall structure of a first embodiment of a parallel processing printer according to the present invention. The structure and procedure are as follows.

(1) A user carries out a printing process by using an application 1. The application 1 outputs a source code 2 written in a parallel processing page description language (hereinafter abbreviated to parallel processing PDL). A part of a modern OS which attaches great importance to a graphical user interface function may be designed so that a printer control function is not imposed on the application. In this instance. the application 1 calls out a built-in software function (function and procedure) called a printer driver provided by the OS. The source code 2 written in the parallel processing PDL is outputted in accordance with the thus called-out function/procedure in the printer driver 11.

(2) A parallel language compiler 3 receives the source code 2 outputted from the application 1 (or printer driver 11) and outputs an object code 4. The object code 4 is a train of data constituted by machine language words for a virtual machine and necessary parameters.

(3) The virtual machine 5 receives the object code 4 and interprets and executes the machine language commands thereof to generate pixels.

(4) The printer 6 receives pixel data generated by the virtual machine 5 and carries out a printing process page by page.

In the aforementioned procedure. the steps (1) and (2) are executed sequentially. Accordingly. the application 1 and the parallel language compiler 3 may be executed by one and the same computer. In this occasion. communication between the application 1 and the parallel language compiler 3 is performed by a process called interprocess communication.

On the other hand. the step (3) is parallelly executed by using a plurality of PCs or WSs. The same processor device may execute the parallel language compiler 3 and at least one virtual machine 5. In this instance, communication between the parallel language compiler 3 and the virtual machine 5 is still interprocess communication.

Alternatively, the parallel language compiler 3 and the virtual machine 5 may be executed by separate processor devices, respectively. In this occasion, communication between the parallel language compiler 3 and the virtual machine 5 is performed by using a network. Further, communications between the virtual machine 5 and another virtual machine 5 are performed by using a network.

Interprocess communication and communication using a network is described in W. Richard Stevens "UNIX NETWORK PROGRAMMING", Prentice Hall, Inc. 1990 (Note: UNIX operating system was developed by UNIX System Laboratories, Inc. and has been licensed).

Explanation of Process:

A process is a unit for managing resources such as CPU time, memory area, and so on, allocated to a plurality of processing programs by the OS. A process comprises a process header including a process identifier and information for execution management/memory management, an area for reserving the current states of registers of a processor in case of interruption, an object area, and a stack area. The OS premised in this embodiment executes the plurality of programs simultaneously. One program is constituted by one or more processes. It can be therefore said in other words that execution of a plurality of programs is a process for scheduling processor memory and other resources for a plurality of processes by means of time division. Because communication between programs is performed practically between any one process of one program and another process, the term interprocess communication is used. This term is currently used in publications such as the aforementioned literature.

3. Known Portions of the Mounting Technique of the First Embodiment

The following techniques are known.

(1) A technique for automatically generating a PDL source code by an application or by a printer driver (For example, LaserWriter printer driver program, Apple Computer, Inc.).

(2) A compiler for parallel languages (As described in M. Ben-Ari "PRINCIPLES OF CONCURRENT PROGRAMMING", Prentice-Hall International, Inc. and other textbooks respecting a plurality of parallel languages).

(3) A method for executing page description languages parallelly by a plurality of processor devices (See Japanese Patent Unexamined Publication No. Hei-3-815831, by the inventor of the present invention).

(4) Program execution using virtual machines (As described in Ikuo Nakata "Compilers", Sangyo-Tosho, 1981, and other textbooks respecting a plurality of compilers).

4. Features of the First Embodiment

With respect to features of this embodiment, those features which are shown in Japanese Patent Unexamined Publication No. Hei-3-815831 will be first described and then those features which are different will be described.

Processing features which are equivalent to those in Japanese Patent Unexamined Publication No. Hei-3-815831:

(A) A plurality of processor devices cooperate to parallelly execute the steps of: interpreting the contents of a source code written in a page description language; generating pixels; and performing printing by using one printer.

(B) In the step (A), the plurality of processor devices may vary according to CPU architecture and the operating system. The architecture difference between respective processor devices is absorbed by using virtual machines.

(C) In the step (A), the plurality of processor devices are connected to each other by a network.

Processing features which are different from those in Japanese Patent Unexamined Publication No. Hei-3-815831:

(1) In Japanese Patent Unexamined Publication No. Hei-3815831, the application 1 outputs a source code in accordance with language specifications for PDL but the language specifications for PDL in this occasion do not contain any parallel processing description. In other words, there is no parallel PDL. On the contrary, in the first embodiment of the present invention, language specifications for parallel processing PDL are defined so that the application 1 outputs a source code 2 written in parallel PDL.

(2) In Japanese Patent Unexamined Publication No. Hei-3815831, parallel PDL is not used, so that a process of analyzing the source code and taking out parallel-executable portions is carried out as a process before the PDL compiler. On the contrary, the parallel language compiler 3 in the first embodiment of the present invention generates a train of machine language codes in accordance with parallel description. That is, parallel-executable portions are set in the source code in advance, so that a plurality of specific machine language words for making processes parallel are inserted into the object code in accordance with this setting.

5. Outline of Characteristic Portions of the First Embodiment

As described above in 4.(1), a characteristic of this embodiment is that the application (or printer driver) generates a source code describing the contents of image processing in accordance with parallel processing PDL grammar. The following two techniques are central to this characteristic.

(1) Grain size detecting process 48, and (2) Parallelization position detecting process 49

From the characteristic of page description language, there is required a step of detecting image manipulation procedure/function which depends on results of preceding image processing. This step is subordinate to the parallelization position detecting process 49. Specifically, a judgment as to which command in the page description language depends on the preceding process can be made as long as dependent commands are provided as an internal recording. Because the number of commands in a programming language ranges from the order of several tens to the order of one hundred and several tens at the largest, it is easy from the point of view of mounting to provide commands as a dictionary to which discrimination flags are added. Further, this is a known technique.

The operation of the processes 48 and 49 will be described in Paragraph 6B-2 with reference to FIG. 4.

6. Details of the Characteristic Portion of the First Embodiment

In the following, the technique which characterizes the present invention described in Paragraph 5 will be described in detail.

6A. Language Specifications of Parallel PDL (1) Explanation based on a Simple Example In the parallel processing PDL in this embodiment, a language in which parallel syntax and extension for image processing are added to a subset of the language Pascal is defined and used. To explain the extension portion in the grammar of this language, an example of a simple source code is shown in FIG. 2. A sentence enclosed by predicates "begin" and "end" is called "complex sentence". In the source code in FIG. 2, the subject of parallel execution is a plurality of sentences enclosed by a predicate "proceed" 21 and a predicate "end" 22. A sentence which begins with a predicate "//" 23 is distributed to another processor device and executed parallelly as far as possible. In the case where the other processor device cannot be used, the sentence is executed by the same processor device. A sentence beginning with the predicate "//" 23 is a single sentence or a complex sentence. When a complex sentence is used, description is made as shown in 24. A sentence which begins with a predicate "otherwise" 25, (this is also a single sentence or a complex sentence) is not distributed and always is executed on its own processor device. The predicate "otherwise" 25 is not omissible, so that an empty sentence (a blank sentence) is written when there is nothing to do.

(2) Explanation of Sentence-structure Analyzing Program.

The portion explained above shows specifications of a language, especially specifications respecting parallel sentence structure. As a known technique effective for development of a sentence-structure analyzing program, there is a technique called compiler-compiler. Compiler-compiler is a name of software for receiving a text in which syntax specifications of a language are written and for outputting a source code of a sentence-structure analyzing program. An example known widely is YACC. YACC is in most cases used as a standard tool in the UNIX operating system. Also in this embodiment, the sentence-structure analyzing program of the parallel language compiler 3 is developed by using YACC.

With respect to the sentence-structure of parallel description shown in paragraph (1) above, description of an analysis rule given as an input of YACC is shown in FIG. 3. Here the "//" sentence is expressed in the "when-stm" sentence. As is well known, this is because limitation of the symbols which are allowed to be used in YACC is accepted. Further, the "proceed-end" sentence is shown in a sentence 30. That is, the "proceed-end" sentence begins with a reserved word PROCEED and ends with a reserved word END, so that the "proceed-end" sentence contains when_body and opt_ other as constituent elements. The constituent element when_body begins with a reserved word WHEN and contains statement as a constituent element. Here strings of characters corresponding to main reserved words are as follows.

| | |
|---|---|
| reserved word PROCEED | = character string 'proceed' |
| reserved word END | = character string 'end' |
| reserved word WHEN | = character string '//' |

6B. Operations of Application 1 and Printer Driver 11

In the apparatus of this embodiment, the printing process is started by giving some input to the parallel language compiler 3. This input must be a source file described in accordance with the grammar of "parallel PDL". The process for generating this source file is the application 1 or the printer driver 11. The following explanation is separated into a portion which is known in the art (6B-1) and a portion peculiar to this invention (6B-2).

6B-1. Known Technique For Operating Application 1 and Printer Driver 11

In this embodiment, an available popular personal computer is used as an apparatus for using an application program. In the case of this apparatus, not the application 1 but an independent service program called printer driver 11 generates a source code of PDL at the time of printing. From the function of the OS of this personal computer, the printer driver 11 can be considered as a lower-rank program having a function called print manager 41 incorporated as a service program of the OS.

The printer driver 11 is software developed and supplied in accordance with the printer type so as to be adjusted to the structural characteristic of each printer. Accordingly, in this embodiment, the printer driver 11 adjusted to the specifications of the parallel processing printer of this embodiment is developed and mounted to the aforementioned available personal computer.

FIG. 4 is a diagram for explaining relations between the application 1, the print manager 41 and the printer driver 11. The structure is as follows.

(A) In the constituent elements of the OS in this personal computer, only a portion related to printing and displaying is designated by 42.

(B) A process constituted by procedures/functions for performing pixel generation is shown in an image processing group 43. The image processing group 43 is constituted by a standard procedure 44 prepared in advance and a changeable procedure 45.

(C) The print manager 41 reads a program of the printer driver 11 from an auxiliary storage device such as a hard disk device or the like into a main storage area of a processor and sets the program to an executable state.

(D) A device driver 46 is a process for controlling a physical device 47 such as a serial interface control IC or the like.

The operation is as follows.

(1) The application 1 is used to call the procedures/functions out of the image processing group 43 individually when pixels for graphics and characters are to be generated and displayed on a CRT device.

(2) The application 1 calls out the function of the print manager 41 and carries out processes such as printer driver initialization, and so on, necessary for printing when pixels for graphics and characters are generated and printed by a printer. (If necessary, the application 1 performs setting of hardware such as a serial interface, and so on.) The printer driver 11 is initialized so that the changeable procedure 45 is replaced by a unique procedure group.

(3) When printing is to be performed, the application 1 calls the procedures/functions out of the image processing group 43 in the same manner as in the displaying step (1) and performs printing, following the step (2). In this instance, a process branching program in the image processing group 43 branches into the process of the changeable procedure 45 as a substitute for the standard procedure 44. Because the aforementioned step (2) has been already carried out, a procedure prepared by the printer driver 11 as a result is used.

(4) The printer driver 11 generates a source code of PDL by using the procedure group substituted as the changeable procedure 45. Then, the device driver 46 is called out to transfer data to a PDL processing process.

More specifically, for example, a PDL processing process is incorporated in the printer, so that the device driver 46 sets a serial interface controller as the physical device 47 to perform data transfer as long as this printer is connected to this personal computer through a serial interface.

Or when a virtual machine for PDL processing is mounted to the WS as shown in the structure of this embodiment explained in FIG. 1, the device driver 46 sets a network controller as the physical device 47 to perform data transfer. After reception and execution of this, the WS transfers pixel data obtained as a processing result to the printer 6 to carry out a printing process.

6B-2. Portion of the Technique for Operating Application 1 and Printer Driver 11 Peculiar to this Embodiment In this embodiment, two processes are incorporated in the printer driver 11 in order to output a source code of parallel PDL.

(1) Grain Size Detection Process 48

An object of this process is that the unit of processing to be executed parallelly is managed so as to be set to a suitable size in consideration of the ratio of the time required for distributing a process to the time actually required for generating pixels. In the structure of this embodiment, a time of from the order of several tens to the order of one hundred and several tens of milliseconds is required for transferring the contents of processing from one processor device to another processor device. On the other hand, the time required for processing one sentence existing in a PDL source code, such as line generation, curve generation, or the like, is several milliseconds. Accordingly, if the process is parallelized command by command, the processing speed is reduced contrariwise. This problem however can be avoided when the process is parallelized with a mass of from about 100 commands to about 500 commands as a unit. The size of such a unit to be executed parallelly is called "grain size".

This process will be described with reference to FIG. 5.

(S51) A source code generation process for one page is started on the basis of a page start command and continued until a page end command is detected.

(S52) The printer driver 11 outputs the proceed sentence following the program declarative portion for the purpose of generating a source code upon the assumption of parallel processing as many portions as possible. The grain size detection process 48 is carried out before individual procedures/functions contained in the changeable procedure 45 of the image processing group 43 are called out.

(S53) The grain size detection process 48 increases the counter 55 by +1 by the counting step S53 whenever a procedure is called out.

(S54) The grain size detection process 48 judges whether the value of the counter 55 is greater than 100. If it is greater than 100, the grain size detection process 48 makes a decision that "the calling-out of a procedure sufficiently large in grain size has been made" and sets a grain size flag 56 to =1. The flag 56 becomes a reference for judgment of process parallelization in the following process.

The grain size detection process 48 is terminated here.

(2) Parallelization Position Detection Process 49

An object of this process is that a judgment is made as to whether the pixel generating operation depends on the preceding process or not and that a judgment is made thereby as to whether a parallelized sentence structure is generated or not.

In PDL in this embodiment, from the point of view of image generation, respective commands can be considered to be roughly classified into two groups. One group contains commands attended with pixel generation. Examples thereof are overall printing, image reversion, stroke generation, and so on. The other group contains commands not attended with pixel generation. Examples thereof are the setting of drawing pen size, the setting of a range graphic for overall printing, the formation of a curve shape for stroke generation, and so on.

When there is set the operation of "setting a certain range to make an image reversal between black and white", a result of the operation varies in accordance with the pattern of this shape if a graphic shape formed by various preceding procedures for image generation is present as a background. In the case where such an image processing procedure is to be executed, it is necessary to output a source code of a program so that the execution always follows the preceding command (that is, sequentially). It is important that the parallelization position detection process 49 satisfies this condition. This point will be explained with reference to FIG. 6.

(S61) The parallelization position detection process 49 first judges the characteristic of the command.

(S62) When the command is a command not attended with pixel generation, the parallelization position detection process 49 calls out an actual procedure and generates a procedure sentence used as a source code. In this instance, the procedure sentence is not immediately outputted but temporarily stored in a buffer 60.

(S63) On the other hand, when S61 makes a decision that the command is a command attended with pixel generation, the parallelization position detection process 49 further makes a judgment as to whether this command depends on the arrangement of the preceding pixel or not.

(S64) When the command depends on the preceding pixel, it is necessary that parallel description is completed in a position just after the "procedure sentence attended with pixel generation" issued just after this. The parallelization position detection process 49 therefore issues "otherwise sentence" and "end; sentence". Then, the parallelization position detection process 49 outputs the source code currently existing in the buffer 60 to thereby output a command predicate in this time. Further, the process 49 outputs "proceed sentence" to make preparation for subsequent parallel execution. As a result, there is carried out the description of the contents that parallel execution is once terminated upon the source code and parallel description is started again after the operation dependent on the preceding pixel is carried out sequentially.

(S65) In the case of an operation not dependent on the preceding pixel, the parallelization position detection process 49 examines the grain size of the contents of current processing. That is, the process 49 examines the value of the flag 56 set by the grain size detection process 48. When the flag 56 is not true (herein, =1 expresses truth), the situation of this routine goes back to S62 because the grain size does not reach a sufficiently large size.

(S66) When the grain size is sufficiently large, the parallelization position detection process 49 judges that there is existing one parallel execution unit inclusive of the process already stored in the buffer 60 and of the predicate in this time. The parallelization position detection process 49 therefore outputs a "//begin" sentence, outputs the contents of the buffer 60, outputs the command predicate in this time and then outputs an "end; sentence" to thereby output a source code of a complex sentence which forms one unit of parallel execution. Further, the parallelization position detection process 49 resets the flag 56 and the counter 54 to prepare for subsequent uses.

(Note: In this page description language, "stroke generation" expresses an operation for giving a thickness to the "contour, segment or curve of a graphic defined irrespective of line thickness" in accordance with the currently set pen size.

(3) Example of Outputted Source Code

Figure 5:
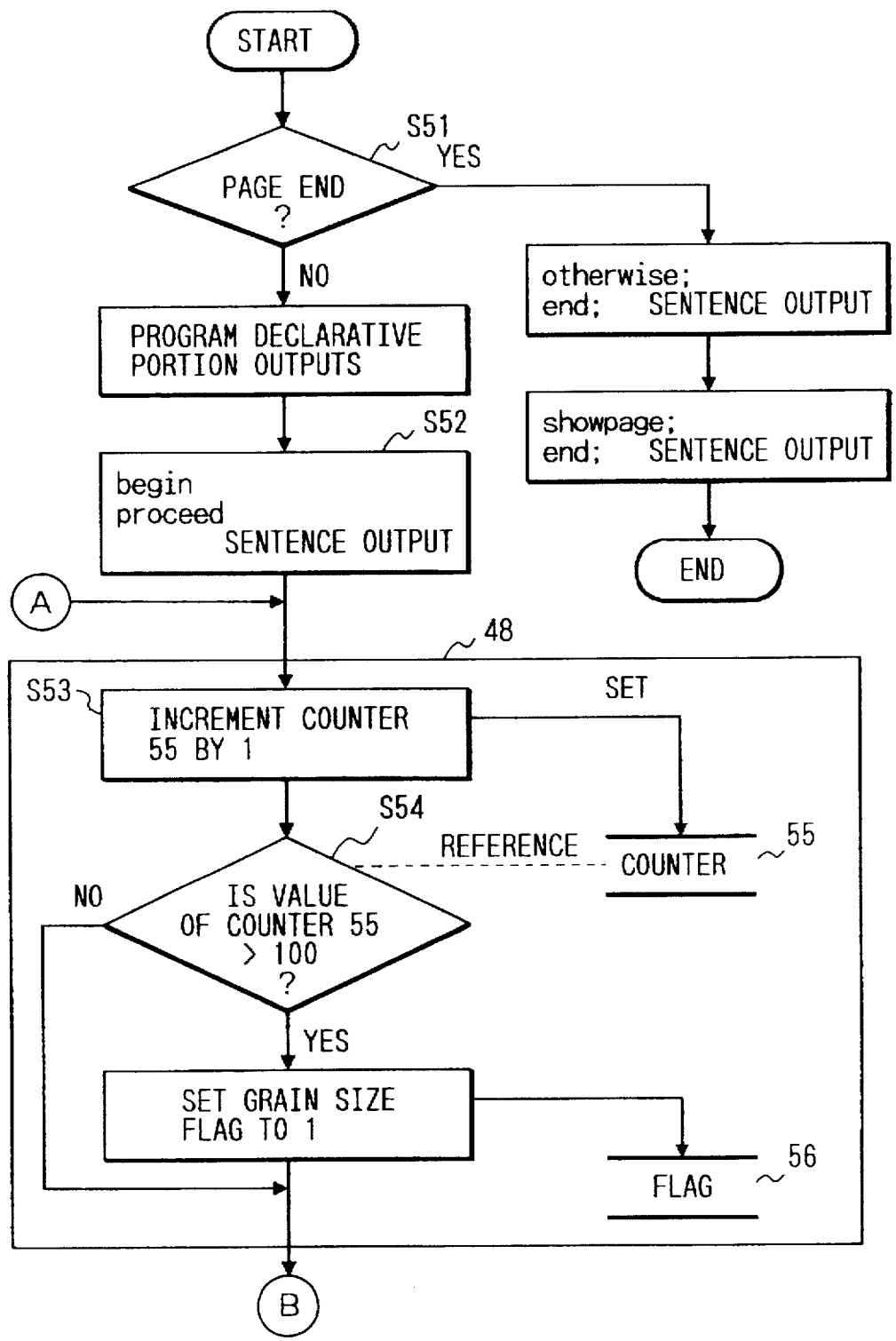
FIG. 5 is a flow chart showing a grain size detection process 48 in the first embodiment.
Figure 6:
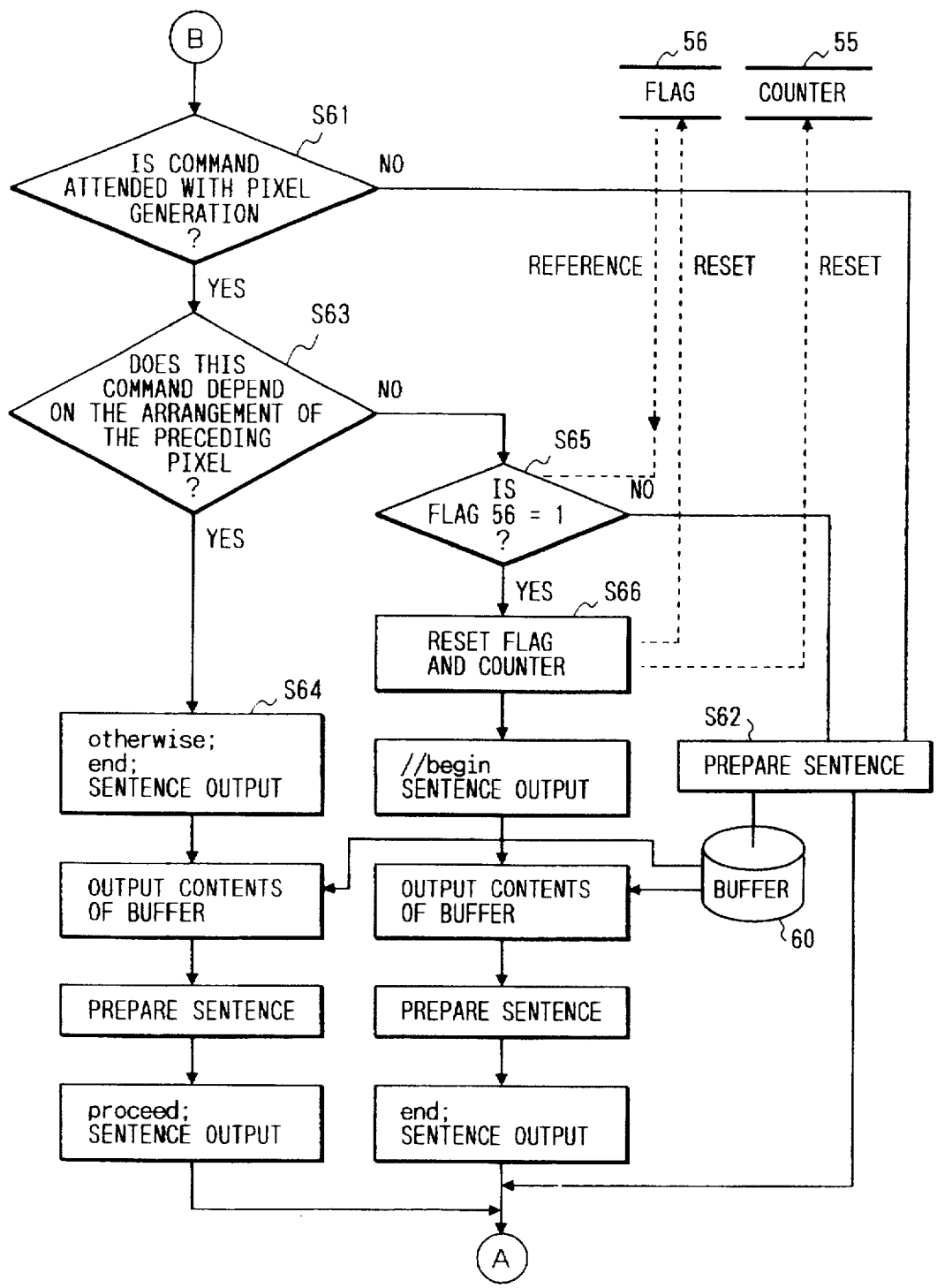
FIG. 6 is a flow chart showing a parallelization position detection process 49 in the first embodiment.

FIG. 7 shows an example of a source code generated in accordance with the procedure shown by the flow charts of FIGS. 5 and 6.

In S52, a program start portion designated by 71 is outputted. In the procedure sentence generation step S62, description of the generated source code is stored in the buffer 60. When the number of command words accumulated in the buffer 60 becomes sufficiently large (the grain size of the processing unit becomes large) and a procedure attended with a pixel operation is called out as a command not dependent on the preceding arrangement of pixels, the parallelization position detection process 49 outputs a "//begin" sentence and successively outputs the contents of the buffer 60 and an "end;" sentence as description 72. By repetition of this, the process 49 outputs a plurality of complex sentences of the "//begin - - - end;" type such as the description 73.

However, when a procedure dependent on the preceding pixels has been called out even once, the parallelization position detection process 49 outputs an "otherwise; end;" sentence by using S64 so that one parallelizable region 74 is terminated.

In this case, the source code from the point of time when a command attended with a pixel operation was outputted lastly before the present point of time up to the procedure just prior to the procedure dependent on the preceding pixels is stored in the buffer 60. The parallelization position detection process 49 outputs the contents thereof. A unit 77 of processing outputted as a result of this operation is outside the "proceed - - - end" sentence in the parallelizable region 74, so that the processing unit 77 is sequentially processed after waiting for the termination of the preceding "proceed - - - end" sentence. Accordingly, even in the case of a command dependent on the preceding arrangement of pixels, a correct processing result is obtained.

Further, the process 49 outputs a "proceed sentence" 75 to make preparation for the next sentence structure to be executed parallelly. By repetition of this, generation of the parallelizable region 74 is performed again.

When the description of the entire page is completed, the printer driver 11 outputs a sentence structure 76. Printing for a plurality of pages is performed by repetition of this.

6C. Mounting and Operation of the Parallel Language Compiler 3

The compiler 3 is constituted by a word/phrase analyzing process, a sentence-structure analyzing process, and a code generation process. As described above, in this embodiment, a source code in a sentence-structure analysis portion is generated by using YACC, so that a compiler is developed. The development of the compiler based on this process has been popularized widely and is a known technique. Further, the word/phrase analyzing process and the code generation process may have no special structure or may have the structure of various kinds of known compiler programs.

The compiler 3 in this embodiment does not output machine language words of any special processor but sets a virtual machine as a substitute and outputs machine language words of the virtual machine. This method has been also popularized widely. Even in the case where a number N of processor devices are used for parallel execution, the compiler 3 outputs object codes of one virtual machine language. The object codes of one virtual machine language contain a virtual machine language designed exclusively for multiplexing processes at the stage of execution. In the following, this will be explained by way of example.

An example of a procedure used for an image operation in this embodiment is as follows.

(a) Procedure not directly attended with the Operation of Pixels

| | | |
|---|---|---|
| newpath() | ... | region definition start command |
| penSize() | ... | drawing pen size setting command |

-continued

| | | |
|---|---|---|
| penPat() | ... | drawing pattern setting command |
| polygon() | ... | polygon/curve definition command |
| line() | ... | line definition command |
| oval() | ... | oval contour definition command |
| others | | |

(b) Procedure attended with the Operation of Pixels

| | | |
|---|---|---|
| strokepath() | ... | contour/line pixel generation command |
| fillpath() | ... | region overall printing command |
| invert() | ... | region pixel luminance inversion command |
| others | | |

Figure 8:
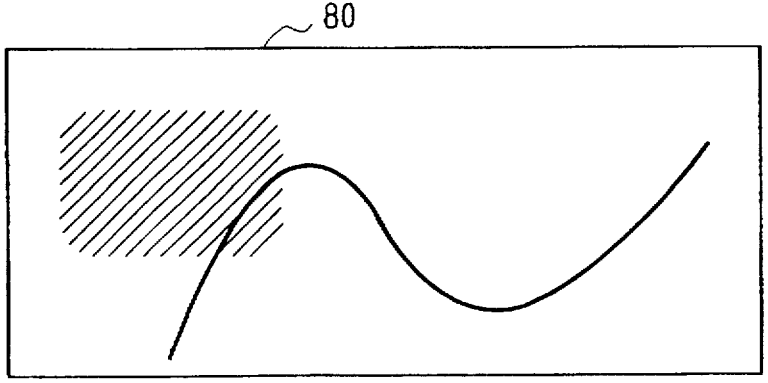
FIG. 8 is a view for explaining an example of the operation of a compiler in the first embodiment.

An example of source code containing simple parallel—executable sentences is shown in FIG. 8. This example is shown for the purpose of explaining a result of processing in the compiler 3, so that the grain size of parallel execution is small compared with the grain size set in the parallelization position detection process 49 in this embodiment. The figure shown in a region 80 is a view of graphics obtained as a result of execution in accordance with a list in FIG. 8.

A list in which object codes outputted from the compiler 3 when processed as an input are expressed in assembler format is shown in FIG. 9. The compiler 3 translates, for example, a procedure sentence 81 into a plurality of virtual machine language code strings which are designated by 91 when the procedure sentence 81 is written in assembler format.

Examples of virtual machine language will be described in brief. PUSHC(OO) places a constant in the uppermost of a stack memory. NEG(17) inverts the sign of the value of the uppermost of the stack memory. TRAP(2a) generates branching with use of software interruption by reference to a dispatch table for calling out each procedure. ADDSP(30) adds a constant to the value of a stack pointer.

Machine language words outputted from the compiler 3 for the purpose of multiplexing processes at the stage of execution are of three types as follows.

(1) FORK(2f)

This is a machine language word generated by the compiler 3 at a position where a "//" sentence or a "//begin - - - end;" complex sentence begins.

(2) EXIT(2d)

This is a machine language word generated by the compiler 3 at a position where a "//" sentence or a "//begin - - - end;" complex sentence ends.

(3) WAIT(2e)

This is a machine language word generated by the compiler 3 at a position where a "proceed - - - end;" sentence ends.

6D. Operation of Virtual Machine

The virtual machine 5 is an interpreter which receives as an input an object code 4 outputted from the compiler 3 and executes virtual machine language command words sequentially.

(A) Structure of the Virtual Machine and Operation Thereof (1) Start

Figure 10:
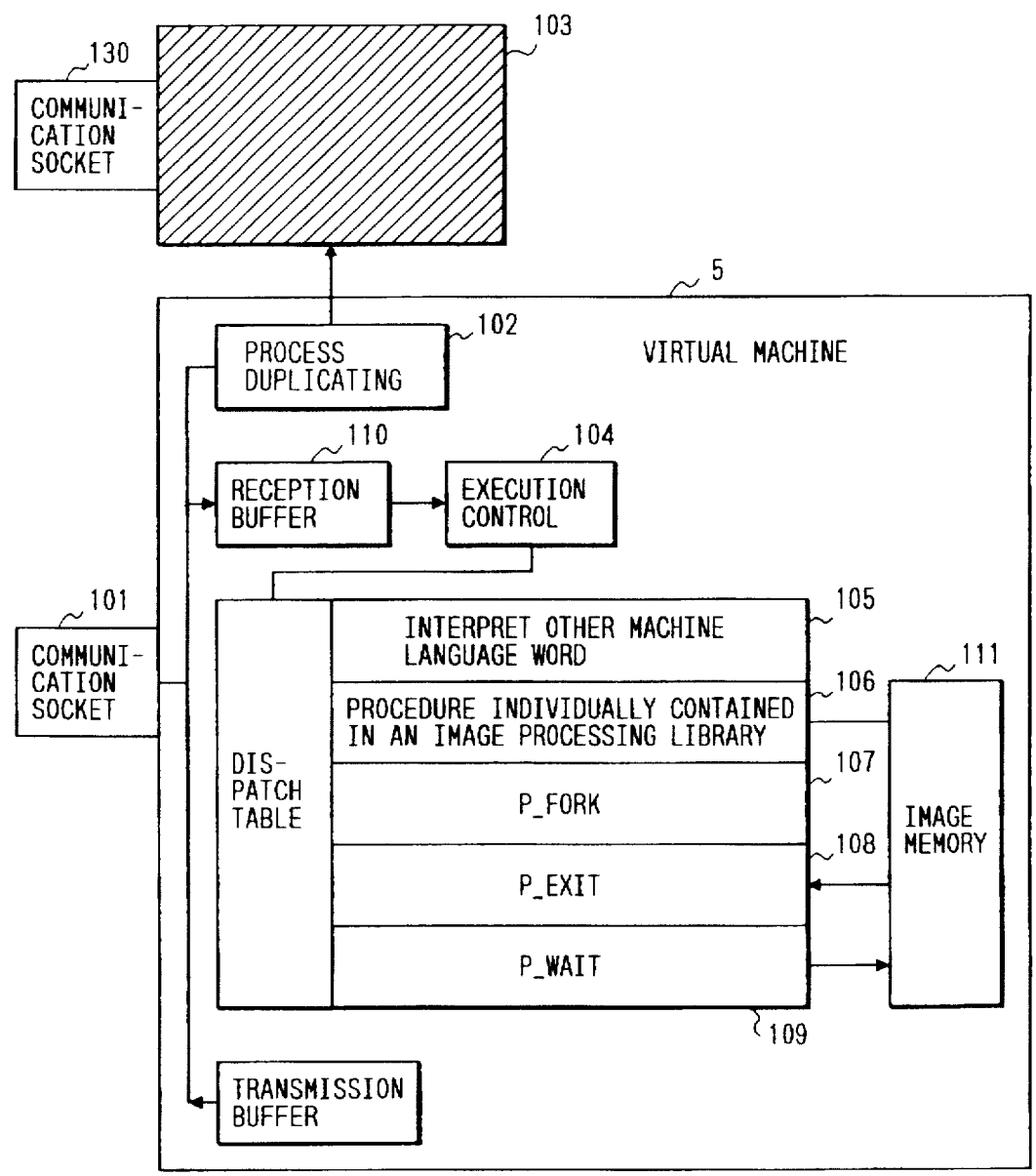
FIG. 10 is an explanatory view of a virtual machine in the first embodiment.

A diagram of the virtual machine 5 is shown in FIG. 10. The virtual machine 5 is one process executed under the management of an OS. The virtual machine 5 communicates with an external program through a communication socket 101. After the completion of the compiling operation, the compiler 3 records the object code 4 as a file and transmits virtual machine language words of the object code 4 to the virtual machine 5. From relations with an after process, all virtual machine language words are temporarily accumulated in a reception buffer 110.

Upon reception of this, the virtual machine 5 makes a process duplicating, process 102 which duplicates a process 103 for carrying out processing equal to its own process. Thereafter, the process 103 executes the virtual machine language object code 4. This method is a known technique which is most popular in the case where a plurality of requests are received by a single process and subjected to multi-task processing.

(2) Execution

The process 103 reads the virtual machine language words of the object code 4 through the communication socket 130 and successively delivers them to an execution control process 104. The execution control process 104 performs the stack management and program pointer management of the virtual machine, and the process 104 generates branching into a real process for each machine language word. The execution control process 104 interprets the meaning of each machine language word and executes a process 105 through a dispatcher in the case of a general control word (stack operating command, operand, jump command). Further, in the case of an image operating command (in this embodiment, this command is started on the basis of a command word TRAP(2a)), a procedure individually contained in an image processing library 106 is executed.

(B) Machine Language Word for Parallelizing a Process and the Operation Thereof

The execution control process 104 executes FORK(2f), EXIT(2d) and WAIT(2e) described above in 6C as command words in specific cases. These commands are constituted by P_FORK process 107, P-EXIT process 108 and P-WAIT process 109, respectively and correspondingly.

(1) P_FORK Process 107

The P_FORK process 107 carries out a process equivalent to the process duplication, in the level of the virtual machine language. That is, the P_FORK process 107 refers to the reception buffer 110 so that data strings of virtual machine language command words from the top to the end are transferred to another virtual machine 5 mounted onto another processor. Referring to FIG. 1, this is designated by communication 9.

As described above, the virtual machine 5 is an interpreter, so that the virtual machine 5 can be mounted easily even to another machine different in architecture. This is because an interpreter program can be mounted easily under management of the OS of the machine after description thereof in a language (for example, C language, Pascal language) developed uniquely to the machine and compilation thereof. Further, communication between the virtual machine 5 and another virtual machine is communication between sockets using a network and is a technique which is currently widely used.

The other virtual machine 5 mounted onto the other processor receives the virtual machine language words, accumulates them in the reception buffer 110 and executes them. In this case, which of the compiler 3 and another virtual machine 5 sent the virtual machine language words cannot be judged. The virtual machine 5 performs execution simply.

Returning to FIG. 9, machine language words will be explained.

Upon execution of processing of the P_FORK process 107 (that is, the FORK(2c) virtual machine language word), the execution control process 104 places the value "0" in the uppermost stage of the stack as a processing result when the transfer of the virtual machine language words is completed correctly. If the process is completed correctly after the command 92 in FIG. 9, the value of the uppermost stage of the stack is equal to zero. When the value of the uppermost stage of the stack is equal to zero, the command 93 carries out an address relative jump. Here the process branches into an address moved forward by +2a in hexadecimal expression. Accordingly, after the P_FORK process 107 is completed correctly, the execution control process 104 in this virtual machine 5 continues the process from address 0033 in hexadecimal expression. As a result, a processing unit 94 (processing unit 82 in FIG. 8) is executed by the other virtual machine 5 whereas this virtual machine 5 goes on to process the next executable sentence (address 0033).

When the P_FORK process 107 is not correctly executed for the reasons of communication failure, incompletion of mounting of the virtual machine, and so on, the value of the uppermost stage of the stack becomes equal to 1. In this occasion, branching in the command word 93 is not executed. Accordingly, machine language words on and after address 000a are processed sequentially. Further, events such as communication failure, incompletion of mounting of the virtual machine, and so on, are detected as error, so that the P_EXIT process 108 is neglected at the error time. Accordingly, when the P_FORK process 107 fails, even a string of machine language words inclusive of parallel processing as shown in FIG. 9 are processed sequentially.

(2) P_EXIT Process 108

In the other virtual machine 5 which has received the virtual machine language words in (1), the value of the uppermost stage of the stack is set to "1" as an initial value. In the example of FIG. 9, branching in the command 93 does not occur. As a result, this virtual machine 5 executes the processing unit 94 (processing unit 82 in FIG. 8).

The last command in the processing unit 94 is EXIT(2d). When this command is detected, the execution control process 104 executes the P_EXIT process 108. As a result of this process, all contents of an image memory 111 is sent as a reply to the virtual machine 5 which is a sender of the virtual machine language command. Thereafter, the execution control process 104 considers the process to be completed and closes the communication socket so that the execution of the process is terminated.

(3) P_WAIT Process 109

The virtual machine 5 which became a sender of the virtual machine language command first falls into a synchronous waiting state at the position of the command word 95. That is, when the execution control process 104 calls out the P_WAIT process 109, the P_WAIT process 109 stands by until the other virtual machine 5 having the process distributed sends a processing result as a reply. When the processing result is sent as a reply, the P_WAIT process 109 duplicates the contents of the image memory 111 returned as a result, to an image memory 111 within its own process.

In this duplication, the value received may be superimposed on the value of its own memory as a logical sum. This is because the aforementioned parallelization position detection process 49 operates so that command words influenced by the previously arranged pixels are not parallelized. In this occasion, the only limitation is the sequence of superimposing. When "independent graphics" obtained from parallel processing are to be superimposed, the graphics are superimposed in the order of description in the source code. In the example of FIG. 8, an image obtained from the first "//begin - - - end" sentence is placed down whereas an image obtained from the second "//begin - - - end" sentence is placed up. As a result, a curve is overwritten on an oblique line portion as represented by the image of the region 80.

(C) Printing Operation

By the aforementioned procedure, the processing results of all image operations in the program are recorded in the image memory 111. As shown in the example of FIG. 8, the image operating command executed at the last of the page description is a "showpage" sentence 83. This sentence is translated into description 96 in FIG. 9, when this command is detected, the virtual machine 5 transfers the contents of the image memory 111 to the printer 6. By this processing, the flow of the printing process per page is completed.

7. Second Embodiment of the Parallelization Position Detection Means 49

A modified example of the aforementioned first embodiment will be explained. The overall structure of the apparatus is the same as that of the apparatus shown in FIG. 1. Further, the preconditions for processing are also the same.

At present, even in a personal computer, the capacity of a main storage device and the capacity of an auxiliary storage device such as a hard disk, or the like, are large. A source code to be outputted can be entirely recorded in the main storage device or auxiliary storage device as long as the recording is temporary.

Figure 11:
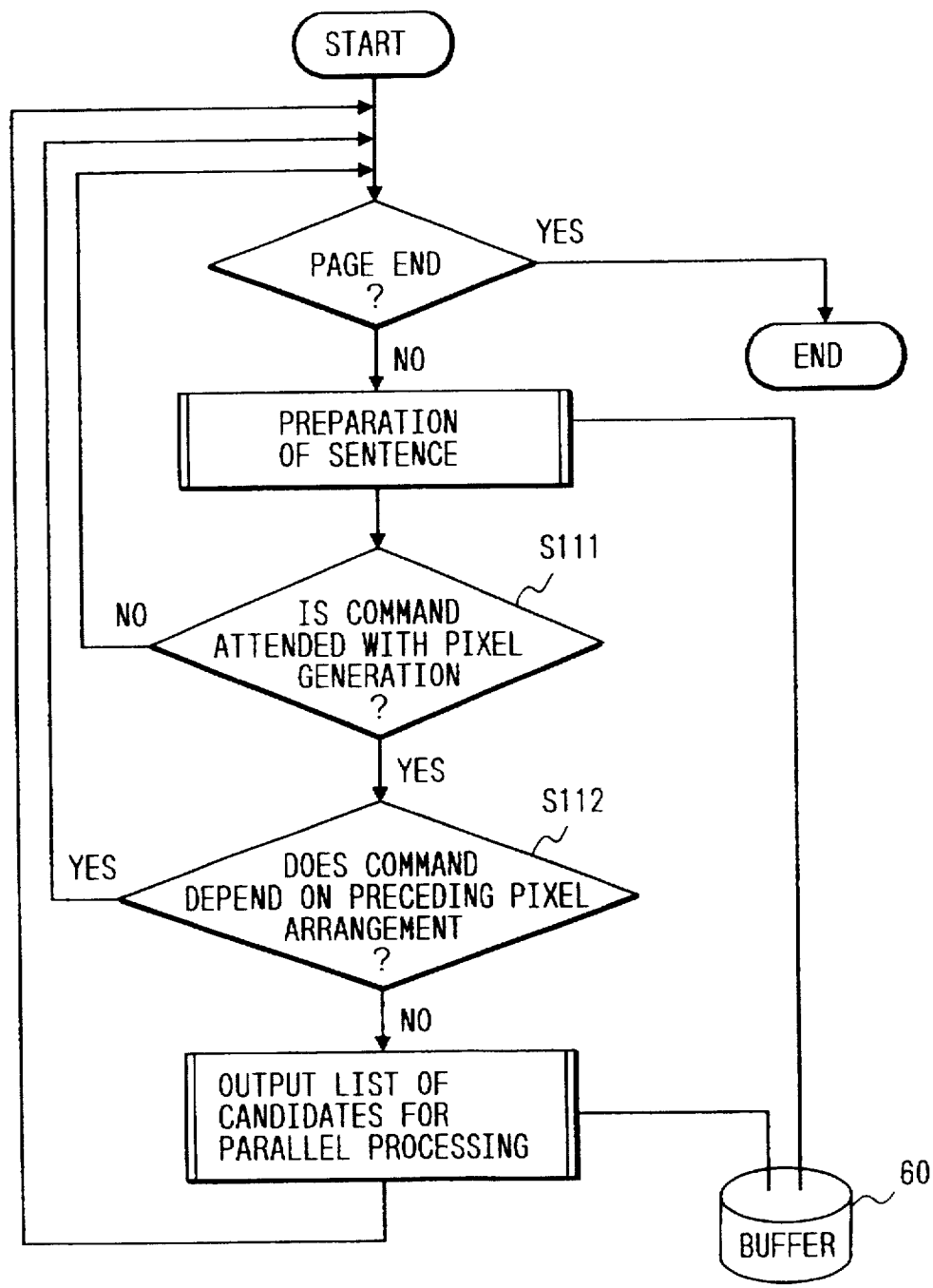
FIG. 11 is a flow chart showing in the parallelization position detection process 49 in a modified example of the first embodiment.
Figure 12:
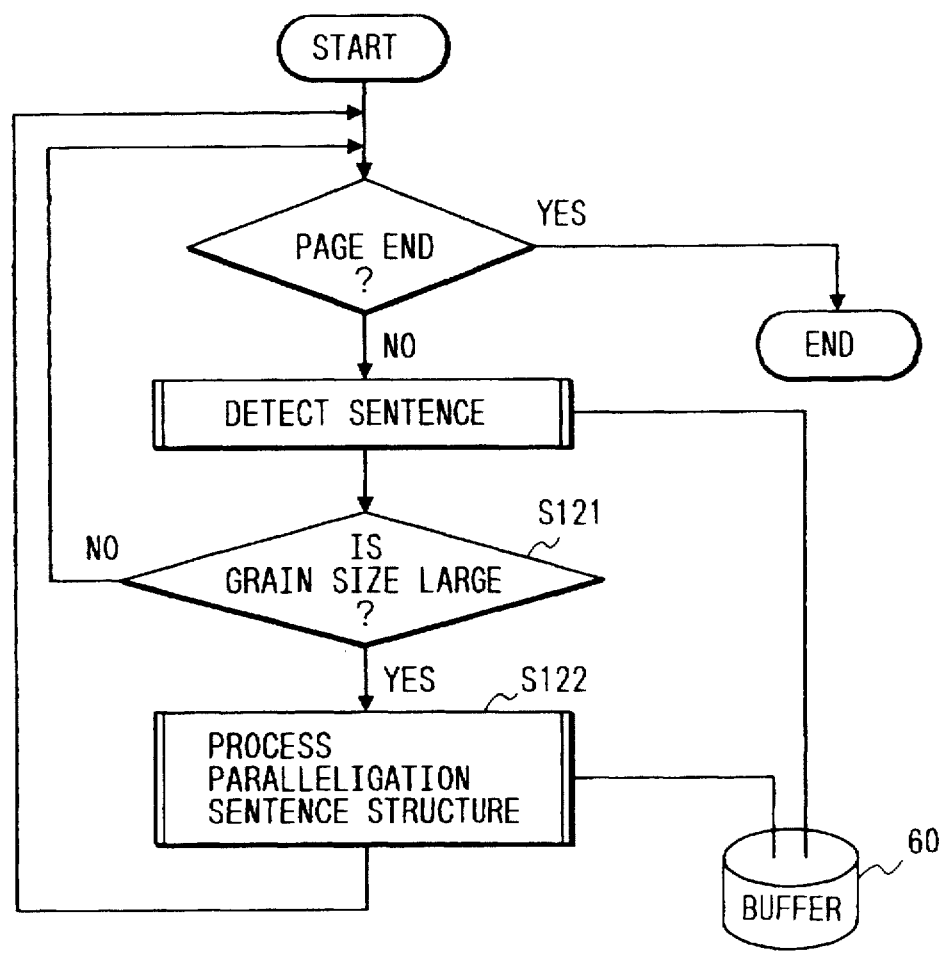
FIG. 12 is a flow chart showing the grain size detection process 48 in a modified example of the first embodiment.

When the buffer 60 can be secured as a sufficiently large region compared with the aforementioned embodiment, procedures shown in FIGS. 11 and 12 can be considered.

(1) Parallelization Position Detection Process 49, FIG. 11

The printer driver 11 generates respective procedure sentences of page description language in a process ranging from the start of a page to the end of the page. A source code generated as a result is recorded in the buffer 60. In this instance, the parallelization position detection process 49 judges whether the command word of the procedure is attended with pixel generation or not (S111). When the procedure is attended with image processing, a judgement is further made as to whether this command word depends on the preceding image processing or not (S112). When the command word does not depend on the preceding image processing, a decision is made that "this position on a sentence structure is a candidate for parallel processing". The parallelization position detection process 49 records a list of such candidate positions in the buffer 60.

(2) Grain Size Detection Process 48, FIG. 12

The grain size detection process 48 reads the source code recorded in the buffer 60 and the list of candidates for the parallelization position successively up to the end of the page. In this case, the number of command words are counted to thereby judge the grain size (S121). When the grain size is larger than a preliminarily set value, a sentence structure of parallelization is additionally written on the source code in accordance with the list of candidates for the parallelization position (S122). In this process, additional writing is performed after the source code is generated once. This process, however, can be carried out at a sufficiently high speed as long as the buffer 60 is arranged in the main storage device.

8. Third Embodiment of the Parallelization Position Detection Means 49

Another modified example of the first embodiment will be explained. The overall structure of the apparatus is the same as that of the apparatus shown in FIG. 1. Further, the preconditions for processing are also the same.

Figure 13:
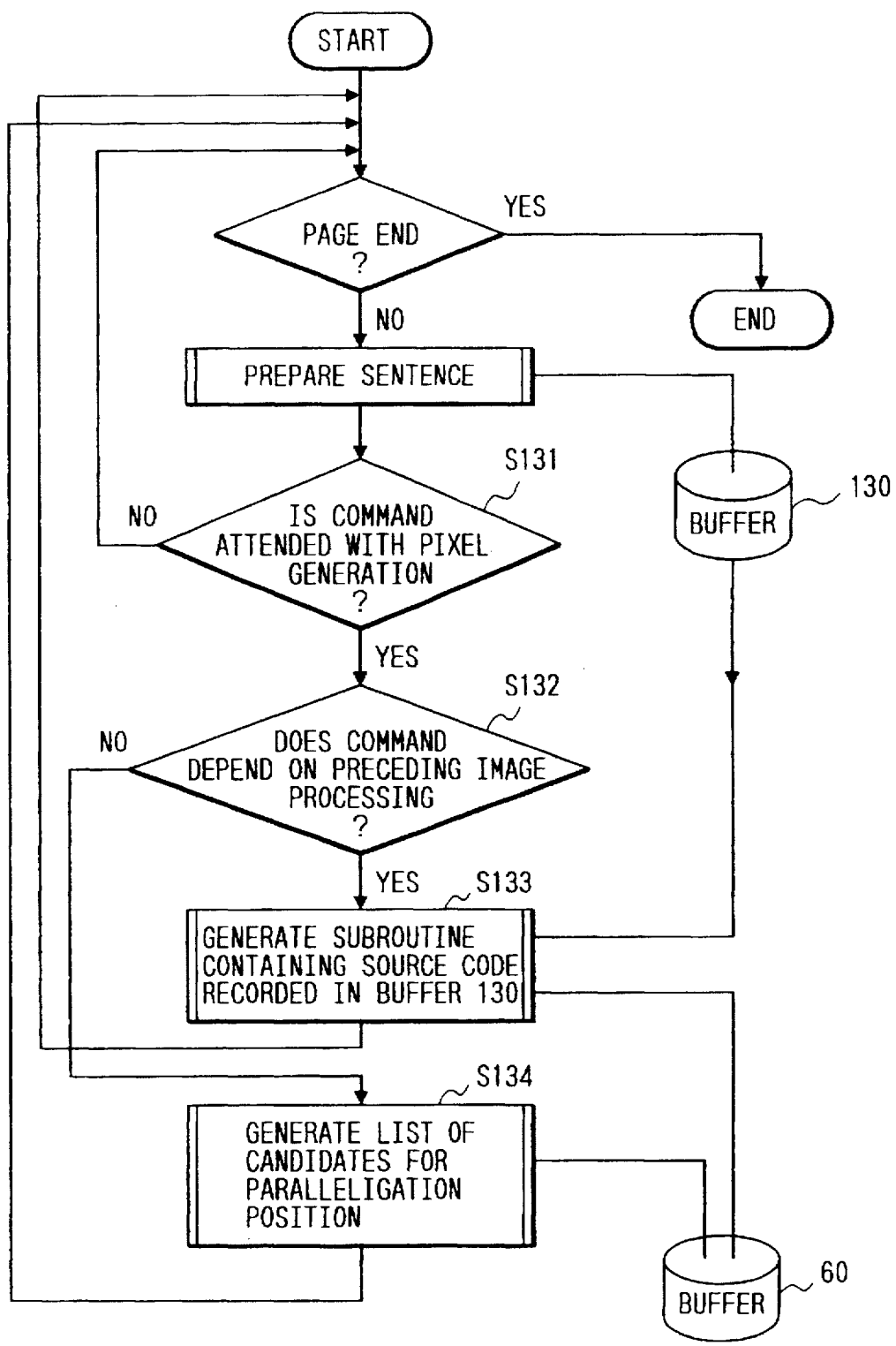
FIG. 13 is a flow chart showing in the parallelization position detection process 49 in another modified example of the first embodiment.

In this modified example, a user description sub-routine function of a programming language is used. Many programming languages have specifications in which a sub-routine can be described, though the name of the function varies in accordance with the programming languages. In the page description language in this embodiment, contents to be processed by a user can be defined as a "procedure" or as a "function", because extension is given to Pascal. A flow of the process will be explained with reference to FIG. 13. In this embodiment, a buffer 130 is used as a second buffer.

(1) Parallelization Position Detection Process 49

The printer driver 11 generates respective procedure sentences of the page description language in a process ranging from the start of a page to the end of the page. A source code generated as a result is recorded in the buffer 130. In this occasion, the parallelization position detection process 49 judges whether the command word of the procedure is attended with pixel generation or not (S131). When the procedure is attended with pixel operation, a judgement is further made as to whether this command word depends on the preceding image processing or not (S132). When a command word dependent on the preceding pixels is detected, the printer driver 11 generates in the buffer 60 a sub-routine (procedure) containing the source code recorded in the buffer 130 (S133). Thereafter, the buffer 130 is cleared to prepare for the next process. On the other hand, when the command word does not depend on the preceding pixels, a list of candidates for the parallelization position is generated in the buffer 60 (S134).

(2) Grain Size Detection Process 48

The grain size detection process 48 is similar to that of the second embodiment of the process 49. A process for judging whether the grain size is large or small, taking out a parallelization position and generating a parallel sentence structure is, however, limited to an internal process of the sub-routine generated in (1). As a result, description to be processed sequentially is out of the subroutine, so that one sub-routine or a plurality of sub-routines containing a parallel executable sentence structure are generated independent of this.

The printer driver 11 performs the description of a portion for calling out a sub-routine and the description of a portion to be processed sequentially, in the main program portion within the source code in accordance with the sequence of processing. Pascal type languages are suitable for the aforementioned process, because the main program in the Pascal type languages is grammar arranged in the last portion of the source code.

9. Further Discussion of the First Embodiment of the Invention (1) Dependence on Specifications of Page Description Language As is obvious from the embodiment of the process 49, the provision of a process for detecting an image processing command word dependent on the preceding image processing result is important in the page description language parallelizing process.

The case where specifications of a page description language are designed so that all command words are independent of the preceding image processing result will be described. In the language having the specifications, there is provided a process in which all image processing results are overwritten irrespective of the precedingly processed pixels. In this case, the following two points are required.

The matching characteristic of the sequence of superimposing described in (3) of 6D is maintained.

With respect to the position of insertion of a parallel sentence structure, the process of page description language with a range at least up to a command word for executing pixel generation as one unit is characterized by the repetition of the procedure "definition of image→generation of pixels". Accordingly, there is required at least one process capable of detecting a command word attended with pixel generation.

(2) Extension of Source Code Generation

In most cases, a source code of page description languages is mechanically generated by software such as a printer driver or the like. A compiler/interpreter of page description language directly receives the mechanically generated source code. In this respect, the inevitability that the source code must be described by character strings is low.

With respect to the source code, there is a method in which predicates constituted by character strings are not used but optimum codes are applied to predicates. That is, binary code description is employed. From the points of view of reduction in code length, reduction in code transfer time and cover-up of information, binary code description is advantageous. Even in the case where the source code is described in a data format other than character strings, the compiler side can be adapted to this case by changing the word/phrase analyzing process. Further, the virtual machine need not be changed at all. Accordingly, it is easy to change the source code description process in this embodiment.

(3) Necessity of the Grain Size Detection Process 48

The grain size detection process 48 adjusts the grain size of parallel processing in accordance with the characteristics of the processing system. In the case of a rough-binding processing system as shown in the first embodiment, the overhead on process distribution cannot be neglected, so that a unit to be processed individually is preferably somewhat large. On the other hand, in the case of an extremely large unit of processing, the number of units to be processed parallelly is reduced so that the effect of improvement in processing speed is reduced. Accordingly, balance with respect to the contents of processing is important. As described above, in the case of a rough-binding parallel processing page description language processing system, a suitable number of command words is approximately 100.

It is possible to remove the grain size detection process 48. In this case, each of command words for image operation forms a unit for parallel execution. This however can be alternatively considered as a result of execution of the grain size detection process 48 at "the grain size =1". This particular case is called "small grain size process". The small grain size process is adapted to a dense-binding apparatus in which the processing time for distributing a process to multiprocessors is very short. This apparatus will be described as a second embodiment in Section 11.

10. Effect Which Arises in the Apparatus of the First Embodiment

In the printer in this embodiment, the application (or printer driver) generates an image description source code effectively as described above in accordance with the grammar of parallel processing PDL. The compiler of parallel processing PDL receives a result of the description as a source file and outputs machine language words of a virtual machine. With this as an input, the interpreter executes generation of images parallelly. As a result, the following effects arise over the whole of the printer.

(1) In the case of a general page printer, the performance thereof with respect to processing speed at the point of time of purchase remains unchanged. However, in the case of a printer having parallel processing PDL mounted thereto, when a virtual machine for parallel processing is mounted to a WS on a network, the processing speed is increased correspondingly. With the enlargement of the number of WSs in an office, improvement in speed of individual printers can be attained.

(2) Even in the case where an end user (consumer) purchases a new high-speed page printer, the end user will have only one fast printer. A user of page printers adapted to parallel processing PDL, however, can increase the speed of all parallel PDL printers by mounting a virtual machine to a fast WS when the fast WS is added to a network.

(3) Among the general advantages associated with parallel processing are prevention of concentration of peak-time loads into a specific apparatus and increased processing speed.

11. Second Embodiment of the Invention

Figure 14:
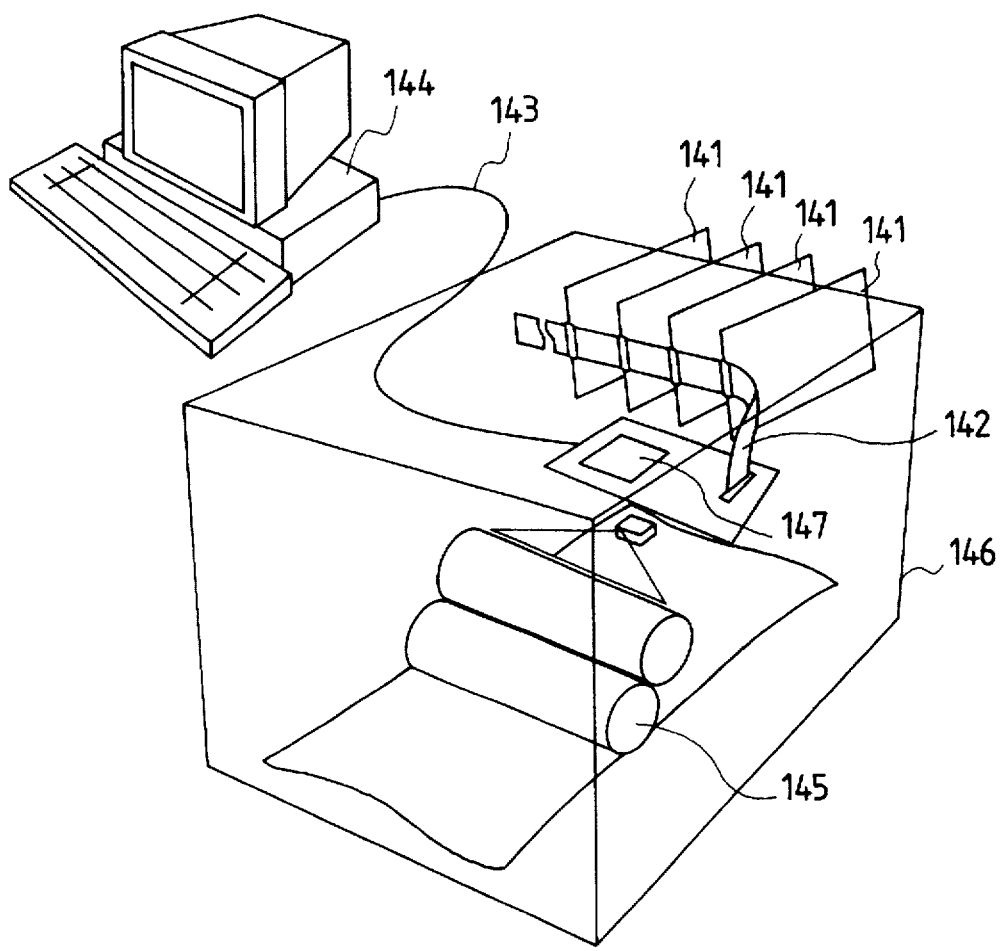
FIG. 14 is a structural diagram of a second embodiment of the present invention.

A preferred embodiment in which the present invention is applied to a small grain size parallel processing system will be described with reference to FIG. 14.

(1) Structure

A page printer 146 is an apparatus having an electrophotographic type print engine 145. An image processor in the page printer 146 is of the type in which a plurality of microprocessor units 141 are bus-connected through a system bus 142. Each microprocessor has access to a common memory 147 through the system bus 142. Each microprocessor processes an interpreter program of a virtual machine which is the same as in the first embodiment. A personal computer 144 is connected to the image processor of the page printer 146 through a communication path 143.

(2) Operation

A user of the personal computer 144 carries out a printing process through an application program. The application program calls out image operations (functions/procedures) for the printing process prepared by a printer driver by using an operating system. The printer driver generates a source code of page description language as a process in a called out procedure. This generation procedure is the same as the process described in 6B-1.

Then, the printer driver calls out the function of a device driver and delivers the generated source code to the page printer 146 through the communication path 143. The page printer 146 compiles the received source code to generate an object code of a virtual machine language. This object code is executed by virtual machines mounted by using a plurality of microprocessors.

(3) Differences between the First and Second Embodiments

In the page printer 146, the plurality of microprocessors can communicate with each other at a very high speed by using the common memory 147 and the system bus 142. In this case, the communication time for process parallelization is short, so that parallel processing may be carried out by each command word attended with an image operation.

In the printer driver side, a parallel sentence structure may be therefore generated whenever an image operation is carried out. As described preliminarily, this shows the specific case where the grain size detection process 48 is executed at "grain size =1". The processing time for process parallelization is, however, not zero even in the case of a dense-binding multiprocessor device as shown in this embodiment. This is natural, judging from the processing time of the virtual machine language word P_FORK(2f). The procedure of P_FORK(2f) in this embodiment is also the same as in the procedure of 6D(1). However, communication is performed using the system bus 142 instead of communication using a network. The parallel processing time is determined mainly on the basis of the number of steps for running a program and the bus arbitration time. This time is from the order of several hundreds of microseconds to the order of several milliseconds.

It can be said from this fact that the grain size detection process 48 is still required and that it is necessary to determine the optimum grain size of processing in accordance with a system which is a target of processing.

(4) Extension of the Second Embodiment

In this embodiment, the architectures of the microprocessor units 141 are uniform. In this case, there arises no problem even when the virtual machine is made to coincide with the real machine. Special machine language words such as FORK(2f), EXIT(2d), WAIT(2e), etc. are not incorporated in the practical microprocessor. However, these can be mounted as library functions. The same thing can be applied to command words for various types of procedures for image processing. This change can be realized by changing the compiler part of the embodiment. The code generation process per se in the present invention cannot be changed.

12. Third Embodiment of the Invention

The present invention is designed so that the grain size is controlled to uniformly distribute loads imposed on a plurality of processors executing parallel processing. The overall structure thereof is the same as shown in FIG. 1 and the overall process is the same as explained in Section 2 with respect to the first embodiment.

13. Characteristics of the Third Embodiment

The characteristics of this embodiment will be explained on the basis of a description of those portions which are similar to Japanese Patent Unexamined Publication Nos. Hei-03-815831 and Hei-04-127284 and then on the basis of a description of those portions which are different from those Japanese publications.

13A. Processing Characteristics Equivalent to Those in Japanese Patent Unexamined Publication Nos. Hei-03-815831 and Hei-04-127284

A plurality of processor devices cooperate to parallelly execute the steps of: interpreting the contents of a source code written in page description language, generating pixels, and performing printing by using one printer.

13B. Differences Between the Invention and Japanese Patent Unexamined Publication Nos. Hei-03-815831 and Hei-04-127284

(1) Differences from Japanese Patent Unexamined Publication No. Hei-04-127284

In the structure of this embodiment, processors are used in a rough-binding state using a network, so that the time of from the order of tens to the order of one hundred and several tens of milliseconds is required for transferring the contents of processing. On the other hand, in the case of a dense-binding processing system using a system bus, this time is from the order of several hundreds of microseconds to the order of several milliseconds. In the rough-binding processing system, therefore, the grain size cannot but be increased.

More specifically, it is suitable that a unit of processing constituted by a plurality of procedure sentences when written in page description language is selected as a unit of parallel processing. In Japanese Patent Unexamined Publication No. Hei-3815931, the present inventor has shown a method in which a source code already generated is read out and divided into a plurality of new source codes. However, a more preferred method is a method in which parallel processing page description language is prepared so that a parallel processing portion in a source code given thereto is set in advance.

(2) Difference from Japanese Patent Unexamined Publication No. Hei-03-815831

The parallel language compiler 3 in this embodiment generates one machine language code string in accordance with the parallel description in the same manner as in the first embodiment. That is, because the parallelly executable portion is set in the source code in advance, a plurality of special machine language words for parallelizing the process in accordance with this setting are inserted into the object code.

14. Outline of the Characteristic Portion of the Third Embodiment

As described above in 13B, the characteristic of this embodiment is that the application (or printer driver) generates a source code describing the contents of image processing in accordance with the grammar of parallel processing PDL so as to make the grain size uniform. The following three techniques are central to this characteristic.

(1) Process 151 for acquiring the number of processors, (2) Process 152 for acquiring the number of procedures for image processing, and (3) Grain size determination process 153.

The operations of the processes 151, 152 and 153 will be explained in Section 15.4 with reference to FIG. 15.

15. Details of the Characteristic Portion of the Third Embodiment

In the following, the techniques forming the characteristic of this embodiment as described in Section 14 will be explained in detail. Further, the same parallel PDL as in the first embodiment is also used in this embodiment.

Figure 15:
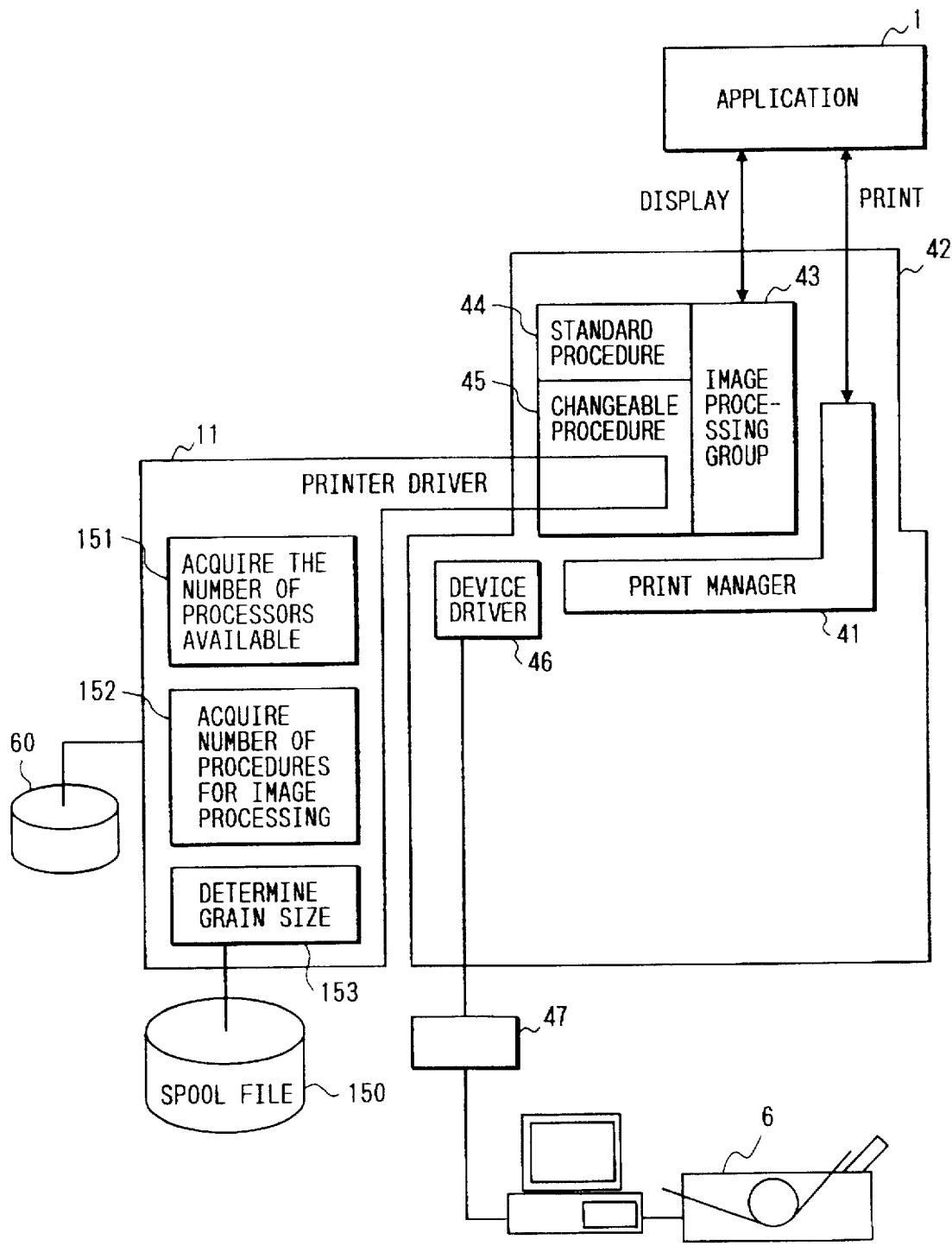
FIG. 15 is an explanatory diagram of the overall structure of a printer according to a third embodiment of the present invention.

FIG. 15 is a diagram for explaining the relationships between the application 1, the print manager 41 and the printer driver 11. In this drawing, the same elements as those in FIG. 4 explaining the first embodiment are referenced correspondingly, and duplicative description will be omitted.

(1) The application 1 is used to call procedures/functions out of the image processing group 43 individually when graphic/character pixels are to be generated and displayed on a CRT device.

(2) The application 1 calls out the function of the print manager 41 and carries out processes such as printer driver initialization, and so on, necessary for printing when pixels for graphics and characters are generated and printed by a printer. If necessary, the application 1 performs setting of practical hardware such as a serial interface, and so on. The printer driver 11 is initialized so that the changeable procedure 45 is replaced by a processing procedure group unique to it.

(3) When printing is to be performed, the application 1 calls the procedures/functions out of the image processing group 43 in the same manner as in the displaying step (1) and performs printing, following the step (2). In this case, a process branching program in the image processing group 43 branches into the process of the changeable procedure 45 as a substitute for the standard procedure 44. Because the aforementioned step (2) has been already carried out, a processing procedure prepared by the printer driver 11 as a result is used.

(4) Generation of a spool file 150 is a method which is carried out widely so that the printing process with respect to the application 1 is completed at an early stage. At the point of time when the generation of the spool file is terminated, the application is released from an input-output process related to the printing process. Thereafter the printer driver continues the process in accordance with data in the spool file. Data reserved in the spool file may be binary code strings for image processing procedures or may be a source code in accordance with specific language specifications. That is, the contents of data vary in accordance with the processing system.

15A. Unique Portions of this Embodiment

In this embodiment, three processes are incorporated in the printer driver 11 to output a source code of parallel PDL so that parallel execution is made uniform.

(1) Process 151 for Acquiring the Number of Processors

In the parallel processing system in this embodiment, the largest number of processors possible is used to execute the process. An object of this process is that a virtual machine 5 (see FIGS. 1 and 10) for performing a pixel generation process is mounted and the number of processors which can be used for parallel processing is acquired. Available processors include those in computers connected to the network, those in other information apparatuses and processors in the printer itself.

To obtain a processor, there is a method in which the processor to be used is recorded in a file or the like in advance. In the case of this method, it is easy to obtain the number of processors. In the process for acquiring the number of processors in this embodiment, besides the aforementioned method, there is employed a method for checking at the time of parallelization whether processors connected for some processing are enabled, to execute process generation or not and to thereby acquire the number of processors.

Figure 16:
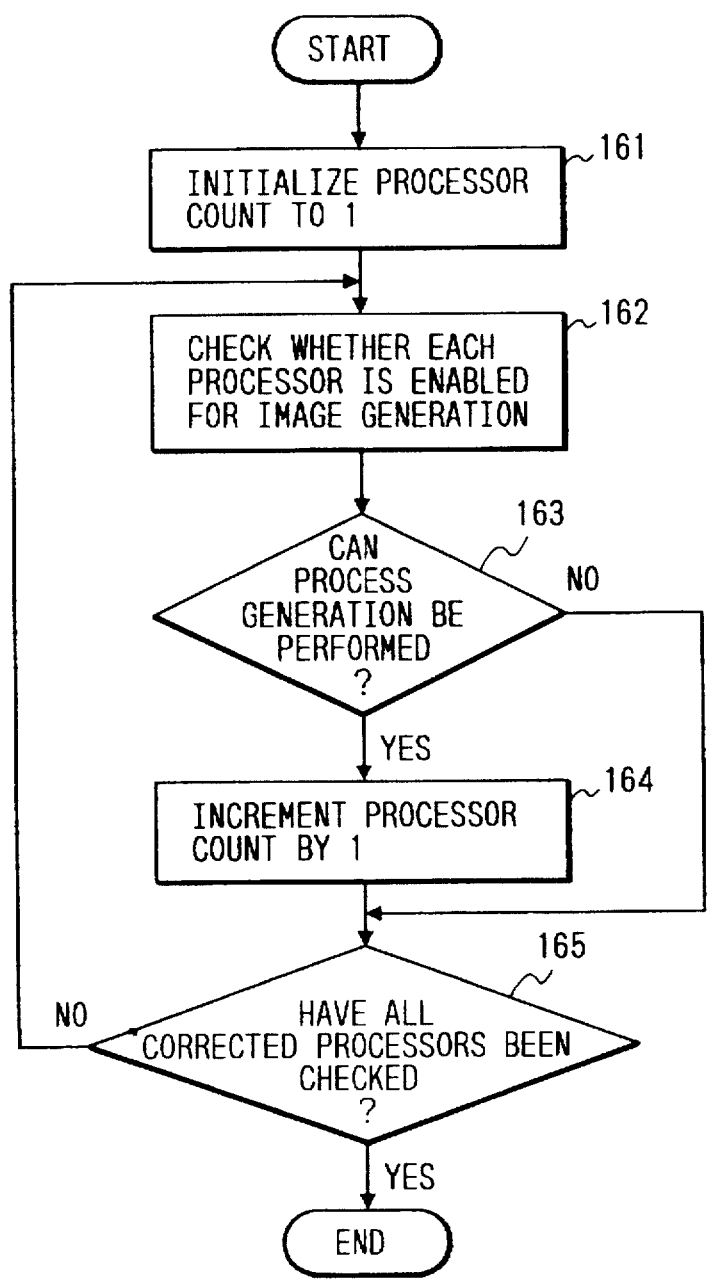
FIG. 16 is a flow chart showing a process 151 for acquiring then number of processors in the third embodiment.

The procedure will be explained with reference to the flow chart of FIG. 16.

(161) The process 151 for acquiring the number of processors initializes the count of the number of processors to "1".

(162) A message is sent to the connected processor to check whether each processor is enabled to generate an image generation process or not. Upon reception of the message, the processor examines the condition of use of the memory, judges whether a new process can be generated or not and sends a resulting message as a reply.

(163) The process for acquiring the number of processors judges whether process generation can be performed or not, in accordance with the contents of the received message.

(164) When the result of the judgment shows that process generation can be performed, the count of the number of processors is increased by one. On the contrary, when process generation cannot be made, the counter is left without any change.

(165) A series of procedures from the step (162) to the step (165) is repeatedly executed until confirmation is made for all connected processors. The count number obtained at the point of time of the completion of the procedure is used as the number of usable processors in the following grain size determination process.

(2) Process 152 for acquiring the Number of Procedures for Image Processing

An object of this process is that the number of procedures to be executed in the printing process is counted. To realize uniform parallelization, first it is necessary to determine the number of procedures in the whole process. In this embodiment, there is employed a method in which the spool file 150 is generated temporarily on the auxiliary storage device before the printer driver generates a PDL source code.

Figure 17:
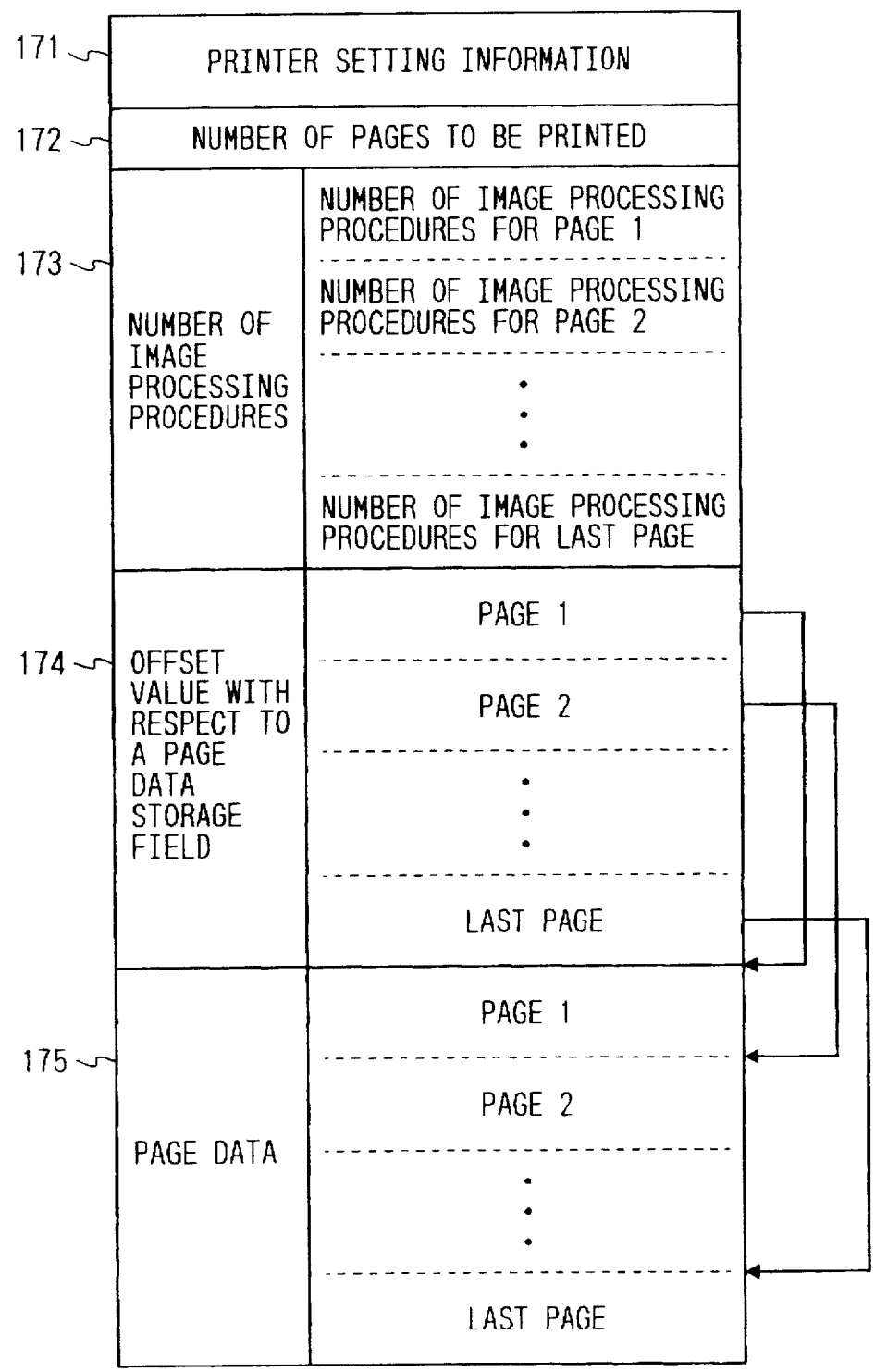
FIG. 17 is an explanatory view of the data structure of a spool file in the third embodiment.

The data structure of the spool file 150 is shown in FIG. 17. The spool file is constituted mainly by the following five fields.

(A) A field 171 for storing printer setting information such as resolution, paper size, and so on, (B) A field 172 for storing the number of pages to be printed, (C) A field 173 for storing the number of image processing procedures, (D) A field 174 for storing an offset value with respect to a page data storage field 175, and (E) The page data storage field 175.

Information is recorded page by page in each of the fields 173, 174 and 175. The page data stored in the field 175 is a procedure code string outputted by the application to draw an image of a document and is recorded as binary data. The process 152 for acquiring the number of image processing procedures counts the number of procedures and records it in the field 173 at the stage in which the aforementioned spool file is generated.

From the point of view of image generation in PDL, respective procedures stored as page data can considered to be roughly classified into two groups. One is commands attended with pixel generation. Examples thereof are overall printing, contour generation, etc. The other is commands by which actual pixel generation is not performed. Examples thereof are the setting of drawing pen size, the setting of a range graphic for overall printing, the formation of a curve shape for stroke generation, and so on. Process processing in page description language is characterized in that the procedure "definition of image→generation of pixels" is repeated. Accordingly, there is required at least one process capable of detecting procedures attended with pixel generation. In this process 152, only procedures attended with pixel generation are made to be a subject of the counting of the number of procedures.

Figure 18:
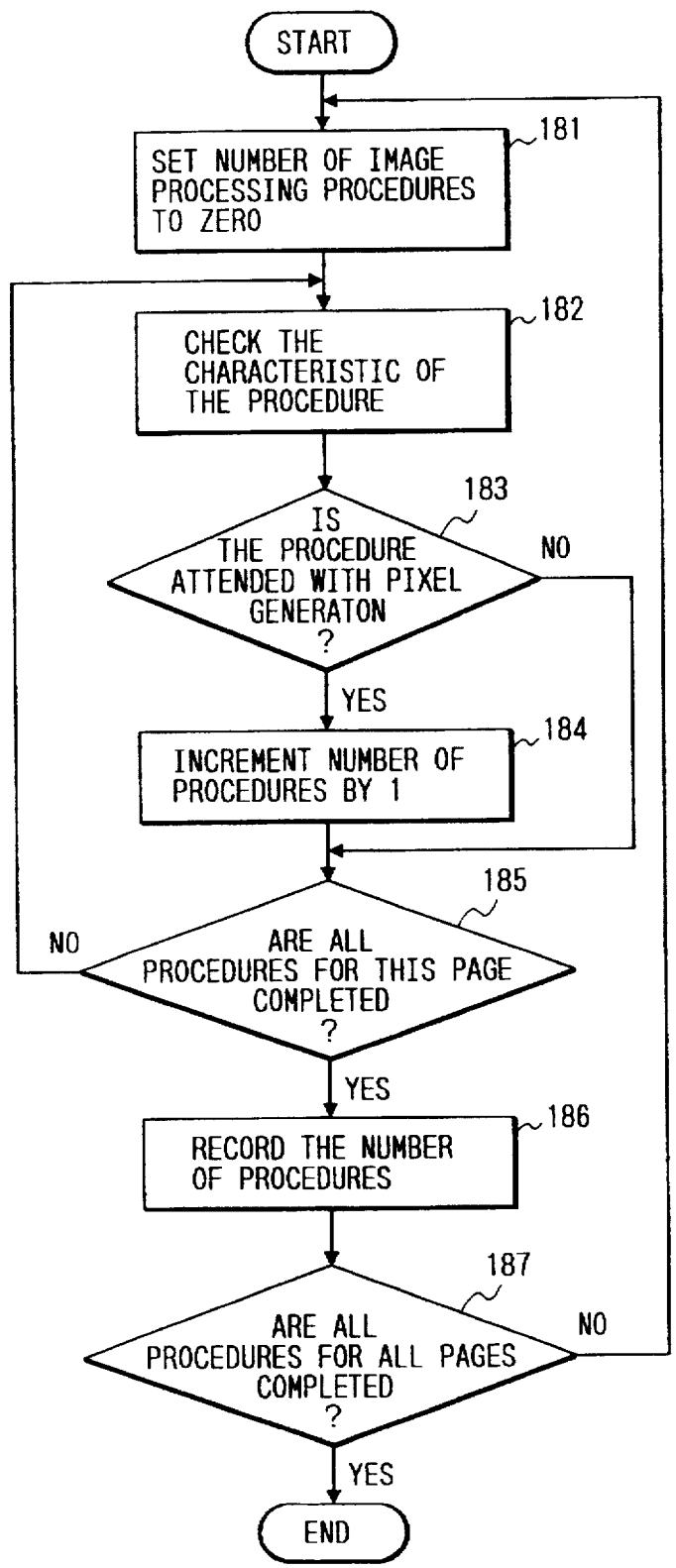
FIG. 18 is a flow chart showing a process 152 for acquiring the number of image processing procedures in the third embodiment.

The procedure in the process 152 for acquiring the number of image processing procedures will be explained with reference to FIG. 18.

(181) The process 152 for acquiring the number of image processing procedures initializes the number of image processing procedures to be 'O'.

(182) Whenever a procedure is written into the spool file, the characteristic of the procedure is checked.

(183) A judgment is made as to whether the procedure is attended with pixel generation or not.

(184) In the case of a procedure attended with pixel generation, the number of procedures is increased by '1'. Contrariwise, in the case of a procedure not attended with pixel generation, the process is continued unchanged.

(185) The number of procedures is counted page by page. A series of operations from the step (182) to the step (184) is repeated until all procedure code strings in one page are completed.

(187) If a decision is made that one-page's code strings are completed, the number of procedures at the current point of time is recorded in an area allocated for each page in the field 173. At the stage in which recording of the number of procedures is completed for each page, the process 152 is terminated.

(3) Grain Size Determination Process 153

An object of this process is to determine the grain size so that the unit of processing executed parallelly is allocated to usable processors uniformly to thereby generate a PDL source code. The flow of the process will be explained with reference to FIG. 19.

(190) The grain size determination process 153 determines the grain size which forms a unit of execution of parallelization. The grain size is obtained by rounding the value of m/n to the nearest whole number in which n represents the value obtained by the aforementioned process 151 for acquiring the number of processors, and m represents the value obtained by the process 152 for acquiring the number of image processing procedures. However, when the value obtained as a result of the calculation is '0', the grain size is set to '1'. When the grain size is determined, the routine goes to a PDL source code generation process.

In this embodiment, there are used page description language specifications that "all command words are independent of the preceding image processing result". In the language of the specifications, there is used a process in which all image processing results are overwritten while the precedingly processed pixels are neglected. In this case, the following two points are required.

The matching characteristic of the sequence of superimposing is maintained as described in (3) of 6D in the explanation of the first embodiment.

With respect to the position of insertion of a parallel sentence structure, the procedure at least up to execution of pixel generation is made to be one unit.

Specifically, the generation of the source code is made by the following procedure.

(191) A program declarative portion is outputted.
(192) A predicate "proceed" indicating the start of parallel execution is outputted.
(193) The counter for counting the number of procedures in one unit to be executed parallelly is initialized to 'O'.
(194) A predicate "//" indicating the start of a parallel-executable unit is outputted.
(195) To count the number of procedures, a judgment is made as to whether the procedure is attended with pixel generation or not.
(196) Only when the procedure is attended with pixel generation, 1 is added to the number of procedures.
(197) Procedure sentences used as a source code are generated and outputted until the page data is completed.
(198) A judgment is made as to whether the page data is completed or not.
(199) A judgment is made as to whether or not the count of the number of procedures at the current point of time is equal to the grain size obtained by the grain size calculation (190).
(200) When the number of procedures becomes equal to the grain size as a result of the judgment (199), a predicate "end" is outputted so that the procedure from the step (193) to the step (200) is carried out again. The aforementioned series of procedures is repeatedly executed until one-page's data is completed (198).
(201) When the page data is completed, the "end" sentence is outputted even in the case where the count of the number of procedures does not reach the value of the grain size.
(202), (203) A program end procedure sentence is outputted to terminate the process.

(4) Example of Outputted Source Code

Figure 19:
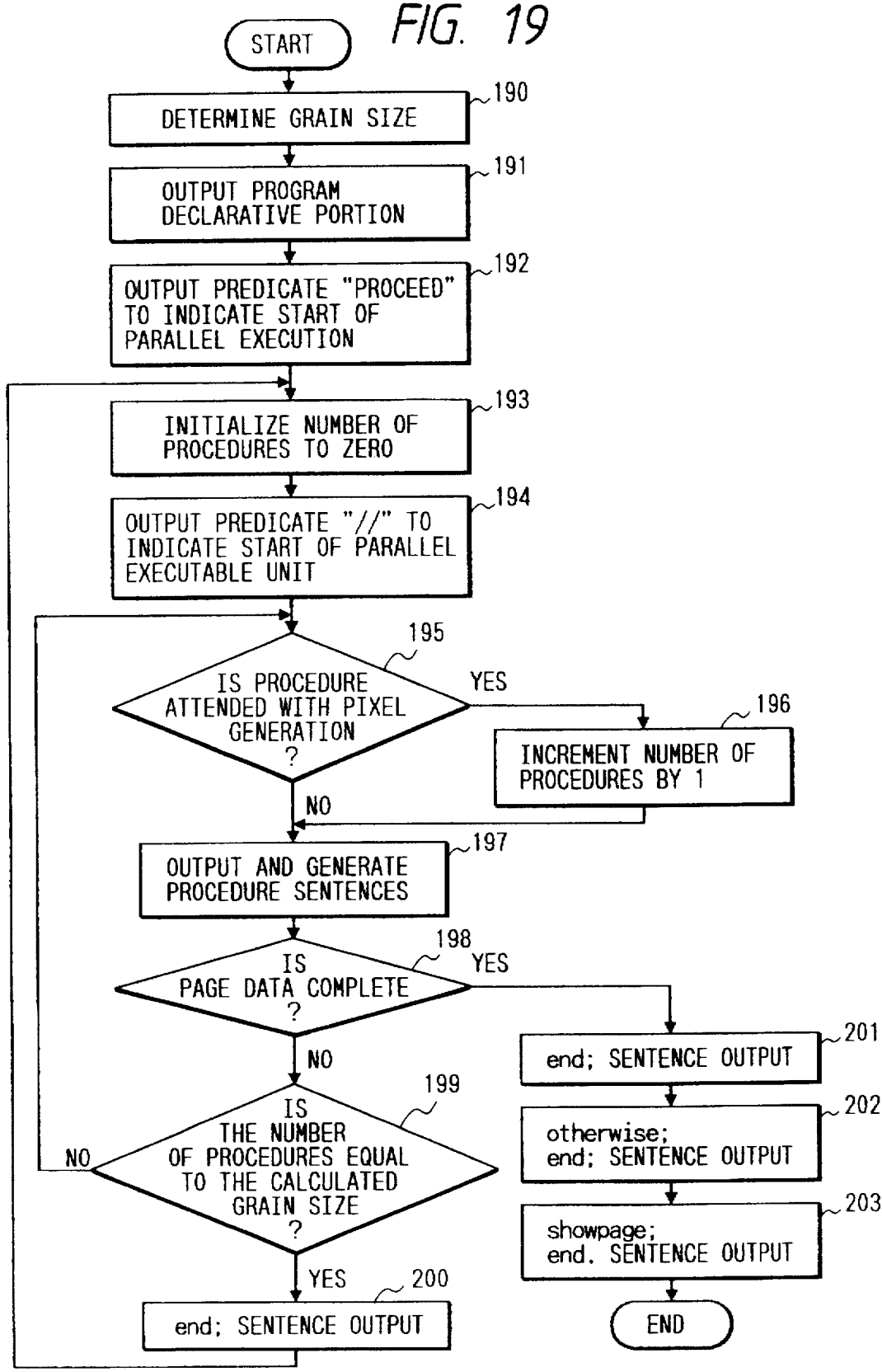
FIG. 19 is a flow chart showing a grain size determination process 153 in the third embodiment.
Figure 20:
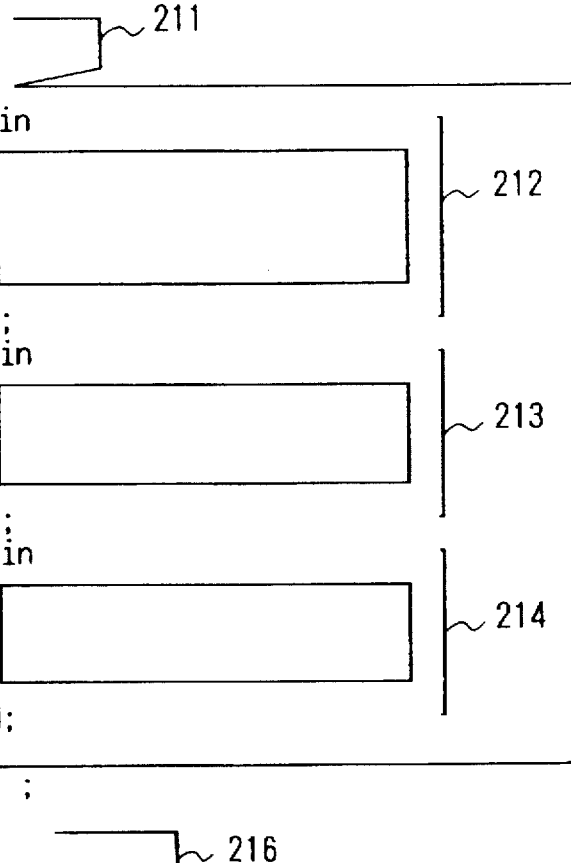
FIG. 20 is an explanatory view of a result of program generation in the third embodiment.

FIG. 20 shows an example of a source code generated in accordance with the process of the flow chart of FIG. 19.

In step (191) in FIG. 19, a program start portion 7,1 is outputted. Procedure sentences used in the source code are generated and outputted as a complex sentence of the "//begin - - - end;" type as represented by description 212 until the count of the number of procedures becomes equal to the value obtained by the grain size calculation step (190). By repetition of this, the grain size determination process 153 outputs complex sentences of the "//begin - - - end;" type by a number equal to the number of processors as represented by descriptions 213, 214, etc. When all descriptions for one page are completed, the printer driver 11 outputs a sentence structure 216. Printing of a plurality of pages is performed by repetition of those steps.

The respective numbers of image generation procedures contained in the complex sentences 212, 213 and 214 in the parallelizable region 215 enclosed in the "proceed - - - end;" form are equal to each other. Accordingly, when the processes of the complex sentences are allocated to usable processors respectively, the processes can be executed parallelly and uniformly.

16. Modified Example of the Third Embodiment

A modified example of the third embodiment will be explained.

The structure of the apparatus is the same as shown in FIG. 1. Further, the preconditions for the process are the same.

At present, even in a personal computer, the capacity of a main storage device and the capacity of an auxiliary storage device such as a hard disk or the like are large. The entire source code to be outputted can be recorded in the main storage device or auxiliary storage device as long as the recording is temporary.

Figure 21:
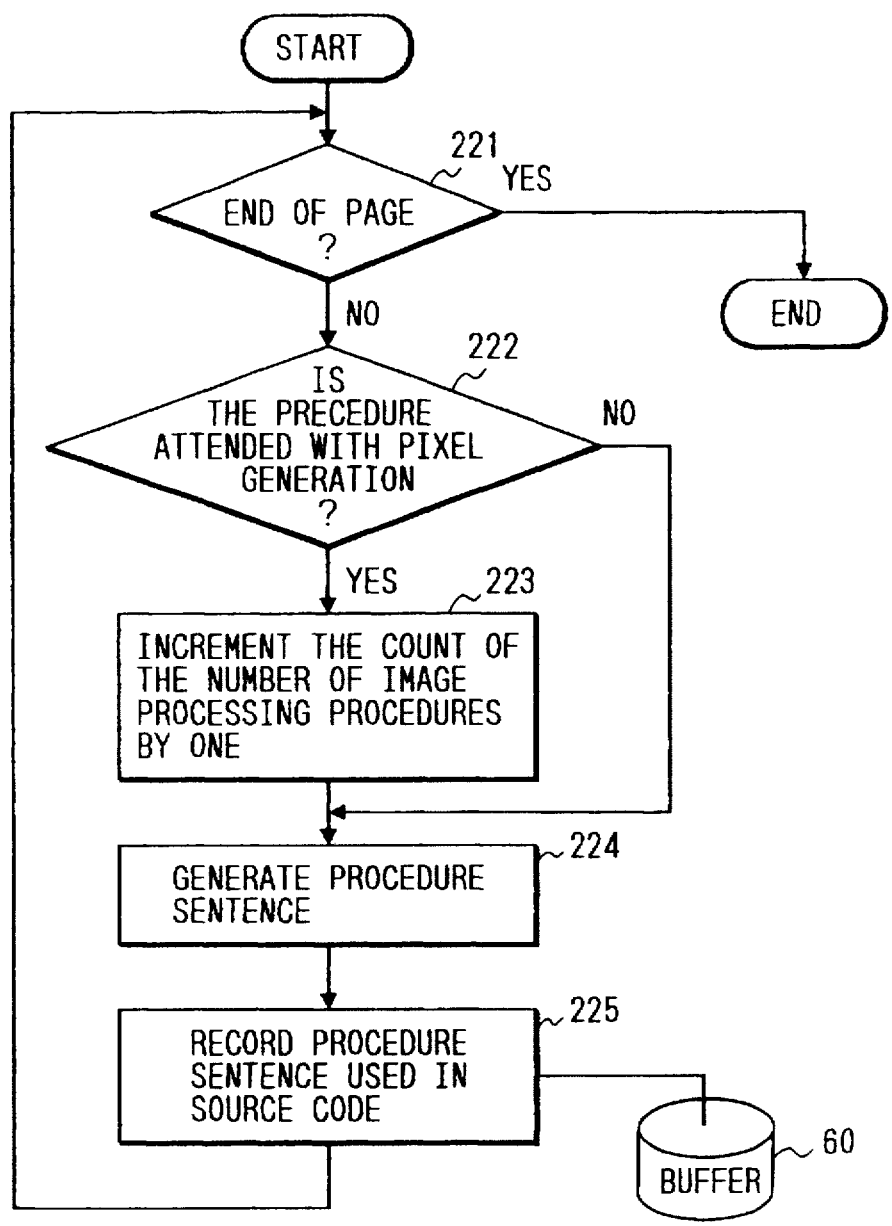
FIG. 21 is a flow chart showing the process 153 for acquiring the number of image processing procedures in a modified example c)f the third embodiment.
Figure 22:
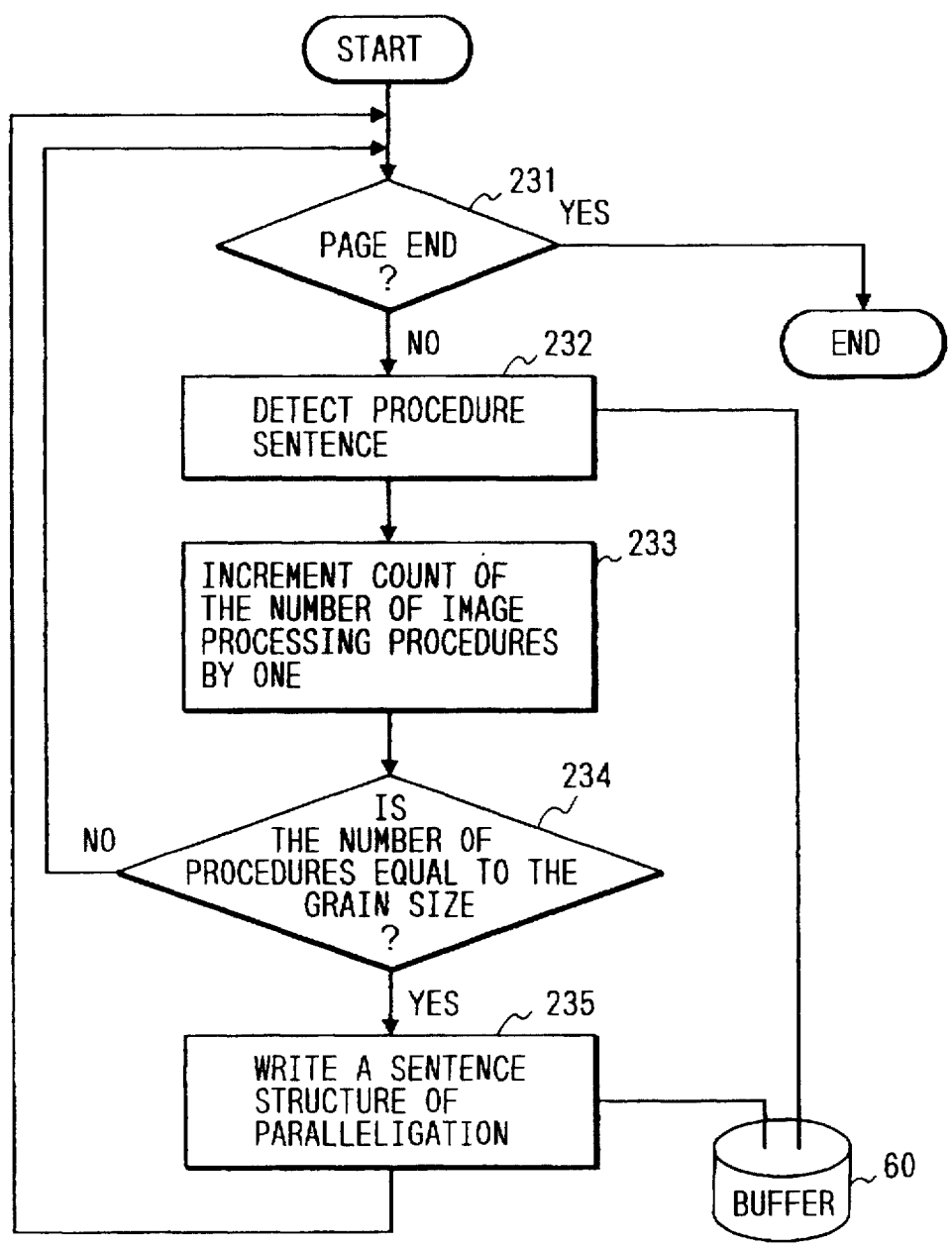
FIG. 22 is a flow chart showing the grain size determination process 153 in a modified example of the third embodiment.

When the buffer 60 can be secured as a sufficiently large area compared with the third embodiment, procedures shown in FIGS. 21 and 22 are considered. The process 151 for acquiring the number of processors is the same procedure as in the third embodiment.

(1) Process 152 for acquiring the Number of Image Processing Procedures, FIG. 21.

(221) The printer driver 11 generates respective procedure sentences of page description language in a process of from the start of a page to the end of the page.
(222) A source code generated as a result is recorded in the buffer 60. In this occasion, the process 152 for acquiring the number of image processing procedures judges whether the command word of the procedure is attended with pixel generation or not.
(223) When the procedure is attended with pixel generation, the process 152 for acquiring the number of image processing procedures adds 1 to the count of the number of procedures.
(224) When the procedure is attended with pixel generation, the count of the number of procedures remains unchanged and a procedure sentence used in the source code is generated.
(225) The source code for the respective procedures is recorded in the buffer 60 until one page is finished.

(2) Grain Size Determination Process 153, FIG. 22

(232) The grain size determination process 151 successively reads the source code recorded in the buffer 60 until one page is finished.
(233) In this occasion, the number of procedures is counted sequentially.
(234) By using the grain size determined on the basis of the number of processors and the number of procedures obtained in the above description, the count of the number of procedures at the present point of time is compared therewith in the same manner as in the first embodiment.
(235) When the count of the number of procedures becomes equal to the grain size, a sentence structure of parallelization is written additionally onto the source code.

In this process, additional writing is performed after the source code is generated once. This process can be, however, carried out at a sufficiently high speed as long as the buffer 60 is arranged in the main storage device.

17. Extension of the Third Embodiment (1) Extension of Source Code Generation

In most cases, a source code of page description languages is mechanically generated by software such as a printer driver or the like. A compiler/interpreter of page description language directly receives the mechanically generated source code. In this respect, the inevitability that the source code must be described by character strings is low.

With respect to the source code, there is a method in which predicates constituted by character strings are not used, but instead optimum codes are applied to predicates. That is, binary code description is employed. From the points of view of reduction in code length, reduction in code transfer time and cover-up of information, binary code description is advantageous. Even in the case where the source code is described in a different data format than the character strings, the compiler side can be adapted to this case by changing the word/phrase analyzing process. Further, the virtual machine need not be changed at all. Accordingly, it is easy to change the source code description process in this embodiment.

(2) Necessity of the Grain Size Determination Process 153

The grain size determination process 153 adjusts the grain size of parallel processing in accordance with the number of the processors. In the case of a rough-binding processing system, the overhead on process distribution cannot be neglected, so that efficiency may be somewhat better when the process is not divided into smaller parts than is required. On the other hand, in the case of an extremely large unit of processing, the number of units to be processed parallelly is reduced so that the effect of improvement in processing speed is reduced. Accordingly, balance with respect to the contents of processing is important.

In the third embodiment, when the number of image operation procedures is smaller than the number of processors, "grain size 1" is set so that each procedure forms a unit of parallel execution. When the size of the whole processing is small, sequential processing is carried out, taking into account overhead caused by parallelization. In this case, a reference is provided to the minimum value of the grain size so that parallelization is not performed when the minimum value is not larger than the reference value. Or a method in which the number of processors used is reduced to increase the grain size can be adapted to this case. In any case, realization is easy.

There can be used also a method in which each procedure is parallelized without use of the grain size determination process 153 shown in the third embodiment. That is, there can be used a small grain size process. The small grain size process is adapted to a dense-binding apparatus in which the processing time for distributing a process into multiprocessors is very short. The explanation of the second embodiment in Section 11 can be applied directly to this apparatus as long as the grain size detection process 48 is replaced by the grain size determination means 153.

18. Effects of the Third Embodiment

According to the third embodiment, in addition to the same effect as in the first embodiment, the following effects are obtained.

(1) Because a process is divided into processing units equal in number to the processors used for parallel processing, the time spent by the parallelizing process is reduced to the minimum so that generation of a source code can be performed efficiently.

(2) The number of predicates contained in a series of operations forming a unit of parallel processing is adjusted to generate a parallelization source code uniform in grain size. As a result, the processing time of each processor is not biased, so that the speed of processing the entire process is increased.

As is made clear from the aforementioned embodiments, the following effects arise from the structural characteristic of the present invention.

(1) Because the parallelization position detection means generates a source code of sequential processing only when there is contained a command dependent on a preceding operation, the time spent by the parallelizing process is reduced to the minimum so that generation of the source code is performed efficiently.

(2) The grain size detection means adjusts the number of predicates contained in a series of operations forming a unit of parallel processing to thereby generate a parallelization source code suitable in grain size. As a result, the language translation/execution processing system can perform efficient parallel execution.

What is claimed is:

1. In an apparatus for generating a source code expressing a series of image processing procedures for image formation, a program generating apparatus comprising:

an independent procedure detection means for detecting independently executable image processing procedures from said series of image processing procedures;

a procedure counting means for counting a number of said independently executable image processing procedures detected;

a procedure set extraction means for extracting a set of procedures constituted by a suitable number of said independently executable image processing procedures as a grain size of a parallel processing unit from said series of image processing procedures on the basis of an output of said counting means; and a parallel sentence structure generation means for generating a sentence structure of a source code which expresses that said extracted set of procedures forms one parallel processing unit.

2. A program generating apparatus according to claim 1, characterized in that said independently executable image processing procedures are image processing procedures not dependent on preceding image processing procedures.

3. A program generating apparatus according to claim 1, characterized in that said apparatus further comprises a pixel generation procedure detection means for detecting image processing procedures attended with pixel generation from sand series of image processing procedures, and said procedure set extraction means extracts said set of procedures on the basis of an output of said pixel generation procedure detection means so that at least one of said image processing procedure attended with said pixel generation is contained in said set of procedures.

4. A program generating apparatus according to claim 2, further comprising:

a sequential sentence structure generation means for generating a sentence structure of a source code indicating relationships in which image processing procedures dependent on a next preceding image processing procedure and at least one of said set of procedures preceding thereto are executed sequentially, on the basis of an output of said independent procedure detection means.

5. In an apparatus for generating a source code of image processing procedures called out successively for image formation, a program generating apparatus characterized by comprising:

an independent procedure checking means for checking whether a called out image processing procedure is an independently executable image processing procedure or not;

a procedure counting means for receiving an output of said independent procedure checking means so as to count the number of continuously called out independently executable image processing procedures;

a grain size detection means for detecting that the number of continuously called out independently executable image processing procedures is a suitable number as the grain size of a parallel processing unit, on the basis of an output of said procedure counting means; and a parallel sentence structure generation means responsive to an output of said grain size detection means so as to generate a sentence structure of a source code expressing that said suitable number of continuously called out independently executable image processing procedures form one parallel processing unit.

6. In an apparatus for generating a source code expressing a series of image processing procedures for image formation, a program generating apparatus characterized by comprising:

a procedure number acquiring means for acquiring a number of image processing procedures contained in the whole of said series of image processing procedures;

a processor number acquiring means for acquiring a number of processors enabled to be used in parallel processing;

a grain size determination means for determining a number of procedures as a reference for the grain size of a parallel processing unit on the basis of the number of procedures and the number of processors acquired above;

a procedure set extraction means for extracting a set of procedures constituted by a suitable number of image processing procedures as said grain size from said series of image processing procedures on the basis of an output of said grain size determination means; and a parallel sentence structure generation means for generating a sentence structure of a source code which expresses that said extracted set of procedures forms one parallel processing unit.

7. A program generating apparatus according to claim 6, characterized in that said procedure number acquiring means acquires a number of image processing procedures attended with pixel generation, contained in a whole of said series of image processing procedures;

said grain size determination means determines a number of procedures as a reference for said grain size on the basis of the acquired number of image processing procedures attended with pixel generation and the number of processors.

8. A program generating apparatus according to claim 6, characterized in that said grain size determination means determines the number of procedures as a reference for said grain size by dividing the acquired number of procedures by the number of processors.

9. A program generating apparatus according to claim 6, characterized in that said processor number acquiring means includes means for inquiring of at least one processor whether the processor can be used in parallel processing or not.

10. In an apparatus for generating a source code expressing image processing procedures called out successively for image formation, a program generating apparatus comprising:

a procedure number acquiring means for acquiring a total number of image processing procedures called out;

a processor number acquiring means for acquiring a number of processors enabled to be used in parallel processing;

a grain size determination means for determining a number of procedures as a reference for a grain size of a parallel processing unit on the basis of the number of procedures and the number of processors acquired above;

a procedure set extraction means for counting a number of image processing procedures called out successively and for comparing the counted value and the acquired number of procedures to thereby extract a set of procedures constituted by a suitable number of image processing procedures as said grain size; and a parallel sentence structure generation means for generating a sentence structure of a source code which expresses that said extracted set of procedures forms one parallel processing unit.

11. In a method for generating a source code expressing a series of image processing procedures for image formation, a program generating method characterized by:

detecting independently executable image processing procedures from said series of image processing procedures;

counting the number of said independently executable image processing procedures detected;

extracting a set of procedures constituted by a suitable number of said independently executable image processing procedures as a grain size of a parallel processing unit from said series of image processing procedures on the basis of the counted number of said detected independently executable image processing procedures; and generating a sentence structure of a source code which expresses that said extracted set of procedures forms one parallel processing unit.

12. In a method for generating a source code expressing a series of image processing procedures for image formation, a program generating method which comprises the steps of:

acquiring a number of image processing procedures contained in a whole of said series of image processing procedures;

acquiring the number of processors enabled to be used in parallel processing;

determining the number of procedures as a reference for the grain size of a parallel processing unit on the basis of the number of procedures and the number of processors acquired above;

extracting a set of procedures constituted by a suitable number of image processing procedures as said grain size from said series of image processing procedures on the basis of said determined number of procedures; and generating a sentence structure of a source code which expresses that said extracted set of procedures forms one parallel processing unit.

* * * * *